United States Patent
Menezo et al.

(10) Patent No.: US 10,690,848 B2
(45) Date of Patent: Jun. 23, 2020

(54) PHOTONIC CHIP WITH INTEGRATED COLLIMATION STRUCTURE

(71) Applicant: COMMISSARIAT À L'ÉNERGIE ATOMIQUE ET AUX ÉNERGIES ALTERNATIVES, Paris (FR)

(72) Inventors: Sylvie Menezo, Grenoble (FR); Salim Boutami, Grenoble (FR); Bruno Mourey, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/260,655

(22) Filed: Jan. 29, 2019

(65) Prior Publication Data

US 2019/0243064 A1   Aug. 8, 2019

(30) Foreign Application Priority Data

Feb. 5, 2018 (FR) ...................... 18 50955

(51) Int. Cl.
   *G02B 6/124* (2006.01)
   *G02B 6/42* (2006.01)
   (Continued)

(52) U.S. Cl.
   CPC ............ *G02B 6/124* (2013.01); *G02B 6/136* (2013.01); *G02B 6/305* (2013.01); *G02B 6/4206* (2013.01);
   (Continued)

(58) Field of Classification Search
   CPC ............... G02B 6/124; G02B 6/136; G02B 2006/12107; G02B 2006/12102
   See application file for complete search history.

(56) References Cited

U.S. PATENT DOCUMENTS 8,515,217 B2   8/2013   Bernasconi et al.
9,285,554 B2 *  3/2016   Doany .................. G02B 6/124
(Continued)

FOREIGN PATENT DOCUMENTS

DE   102014219663 A1   3/2016
WO   2018050180 A1     3/2018

OTHER PUBLICATIONS

Zhenzhou m Cheng et al: "Experimental demonstration of polarization-insensitive air-cladding grating couplers for silicon-on-insulator waveguides", In: Optic Letters, Apr. 1, 2014, vol. 39, No. 7, pp. 2206-2209.

(Continued)

*Primary Examiner* — Ryan A Lepisto
(74) *Attorney, Agent, or Firm* — Pearne & Gordon LLP

(57) ABSTRACT

The present disclosure relates to shaping of optic beams at the inputs/outputs of a photonic chip, the spectral widening of the light coupled to this chip, and a method for manufacturing the chip. The photonic chip includes a light guiding layer supported by a substrate. The chip includes at least one light guiding structure made of silicon coupled on one side to a vertical coupler and on another side to an optical component integrated in the light guiding layer. The photonic chip has a front face on the vertical coupler side and a rear face on the substrate side. A collimation structure of digital lens type is integrated at the level of the rear face to collimate the mode size of the light beam incident on the lens and coming from the vertical coupler.

17 Claims, 22 Drawing Sheets

(51) Int. Cl.
*G02B 6/30* (2006.01)
*G02B 6/136* (2006.01)
*G02B 6/12* (2006.01)

(52) U.S. Cl.
CPC ............. *G02B 2006/12102* (2013.01); *G02B 2006/12107* (2013.01); *G02B 2006/12147* (2013.01)

(56) References Cited

U.S. PATENT DOCUMENTS

| | | | |
|---|---|---|---|
| 2002/0192850 | A1 | 12/2002 | Stoltz et al. |
| 2004/0165637 | A1* | 8/2004 | Bullington ............... G02B 6/34 372/50.11 |
| 2010/0141612 | A1 | 6/2010 | Desieres et al. |
| 2012/0224810 | A1 | 9/2012 | Doerr |
| 2013/0272652 | A1 | 10/2013 | Yaacobi et al. |
| 2015/0285737 | A1 | 10/2015 | Gliere et al. |
| 2016/0049528 | A1 | 2/2016 | Cho et al. |
| 2017/0059754 | A1 | 3/2017 | Frey et al. |
| 2017/0097301 | A1 | 4/2017 | Lefebvre et al. |
| 2017/0242191 | A1* | 8/2017 | Rhee ...................... G02B 6/124 |
| 2018/0039024 | A1 | 2/2018 | Boutami et al. |
| 2018/0204974 | A1 | 7/2018 | Boutami et al. |
| 2018/0335568 | A1 | 11/2018 | Hassan et al. |
| 2019/0011261 | A1 | 1/2019 | Taurel et al. |
| 2019/0018197 | A1 | 1/2019 | Boutami et al. |
| 2019/0064632 | A1 | 2/2019 | Hassan et al. |
| 2019/0094467 | A1 | 3/2019 | Hassan et al. |
| 2019/0113446 | A1 | 4/2019 | Boutami et al. |
| 2019/0120755 | A1 | 4/2019 | Boutami et al. |

OTHER PUBLICATIONS

Chen, Xia et al. Apodized Waveguide Grating Couplers for Efficient Coupling to Optical Fibers:, In: IEEE Photonics Technology Letters, Aug. 1, 2010, vol. 22, No. 15, pp. 1156-1158.
Sacher, Wesley D. et al. "Wide bandwith and high coupling efficiency Si3 N4-on-SOI dual-level grating coupler" In: Optics Express May 5, 2014, Vo,. 22, No. 9, pp. 10938-10947.
Bakir, B. Ben et al. "Low-Loss (<1 dB) and Polarization-Insensitive Edge Fiber Couplers Fabricated on 200-mm Silicon-on-Insulator Wafers" In: IEEE Photonics Technology Letters, Jun. 1, 2010, vol. 22, No. 11, pp. 739-741.
Bernabé, Stéphane et al. "On-Board Silicon Photonics-Based Transceivers With 1-Tb/s Capacity" In: IEE Transaction on Components, Packaging and Manufacturing Technology, Jul. 2016, vol. 6, No. 7, pp. 1018-1025.
Adachi, K. et al. :Emission Beam Engineering of 1.3-μm High-power DFB Laser Using Monolithically-integrated Mirro and Lens for Silicon Photonics, In: 42nd European Conference and Exhibition on Optical Communications, Sep. 2016, pp. 1052-1054.
Search Report for French Application No. 1850955 dated Oct. 18, 2018.
U.S. Appl. No. 16/202,682 entitled Photonic Chip With Folding of Optical Path and Integrated Collimation Structure, filed Nov. 28, 2018.
European Search Report for European application No. EP 19 15 5161 dated Jun. 24, 2019.
Zou, Jinghui et al. "Two-dimensional grating coupler with a low polarization dependent loss of 0.25 dB covering the C-band" In: Optics Letters, Sep. 8, 2016, vol. 41, No. 18, pp. 4206-4209.
Mirotznik, Mark s. et al. "Design of two-dimensional polarization-selective diffractive optical elements with form-birefringent microstructures" In: Applied Optics, Nov. 10, 2004, vol. 42, No. 32, pp. 5947-5954.

* cited by examiner

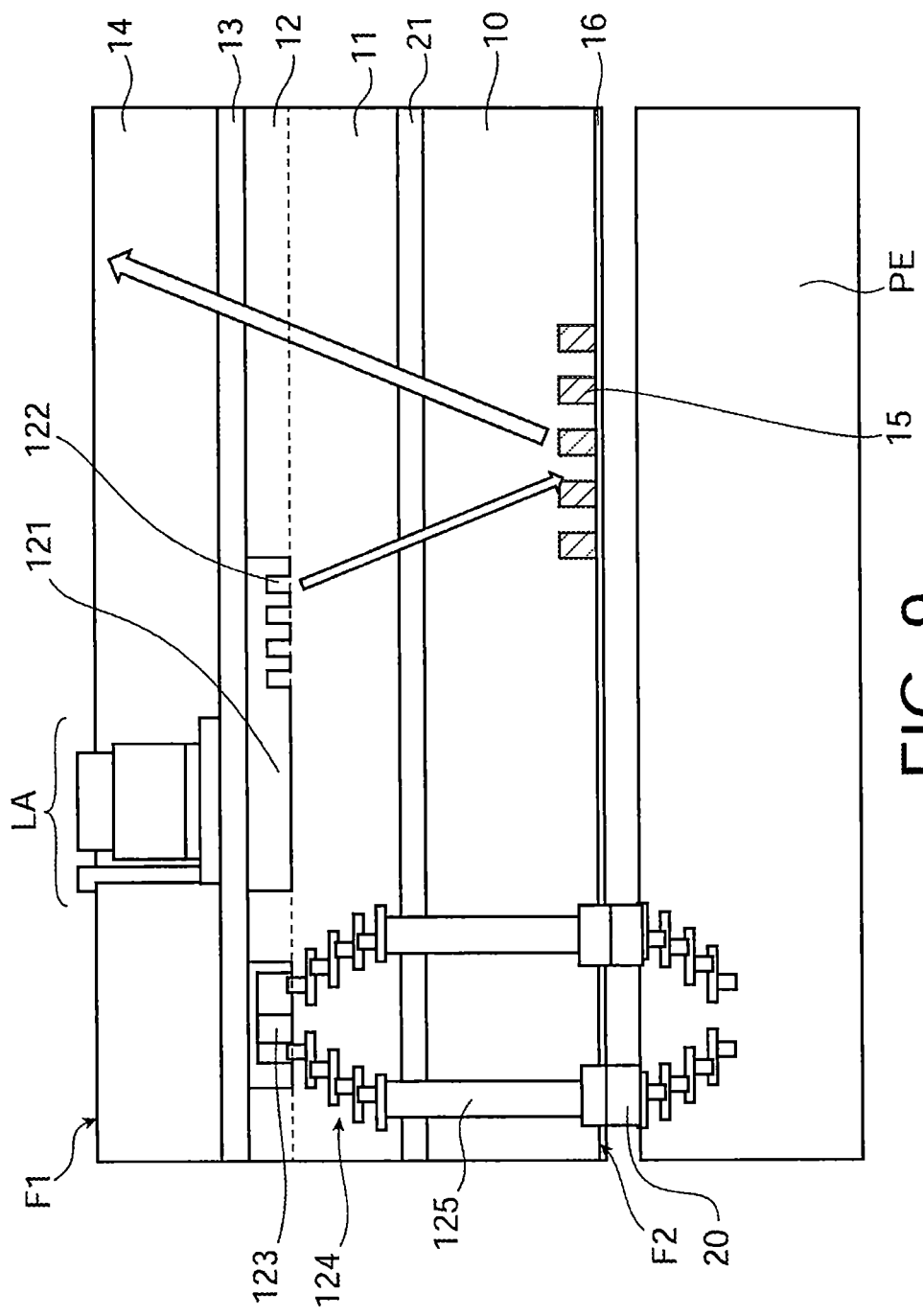

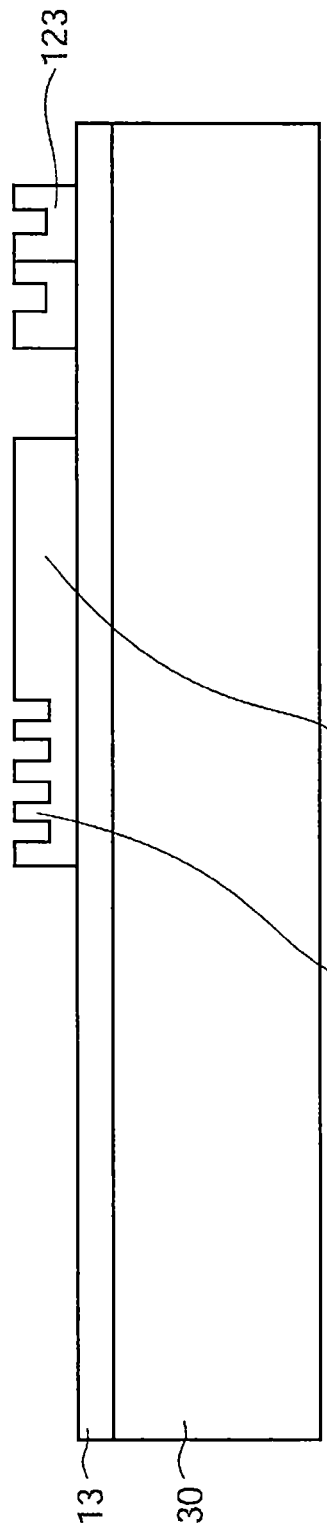
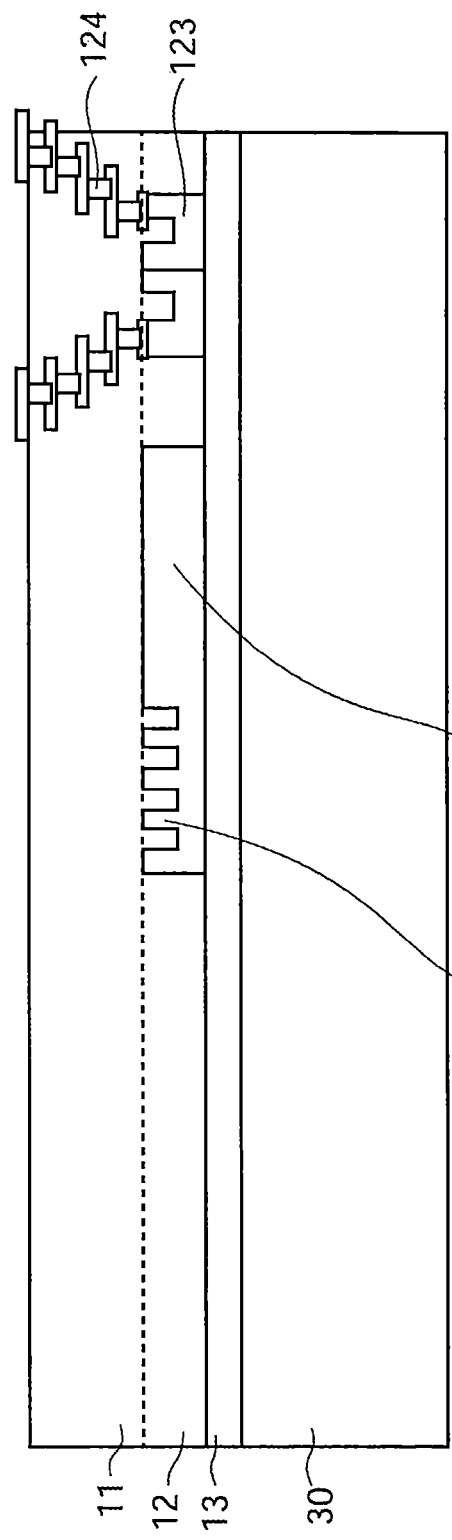
FIG. 11a
FIG. 11b

PHOTONIC CHIP WITH INTEGRATED COLLIMATION STRUCTURE

CROSS-REFERENCE TO RELATED APPLICATIONS

This application claims priority from French Patent Application No. 1850955 filed on Feb. 5, 2018. The content of this application is incorporated herein by reference in its entirety.

TECHNICAL FIELD

The field of the invention is that of on-chip integrated photonics. The invention relates to a photonic chip that has input(s)/output(s), to/from the chip, of light beams for coupling with an external device, for example with another photonic chip, an optic fibre or a set of optic fibres, or for reception/emission of a light beam in free propagation. According to the invention, the input(s)/output(s), to/from the chip, allow the coupling of collimated light beams with a mode size that is potentially expanded with respect the mode size of a single-mode fibre, an axis potentially perpendicular to the surface of the chip (and thus a potentially zero axial angular misalignment with the axis of a beam from a 'lens+fibre' assembly perpendicular to the surface of the chip), and a potentially expanded spectral band.

The chip according to the invention may integrate components such as passive components (waveguides, wavelength multiplexers, etc.) and active components (modulators, photodetectors, etc.). The photonic chip according to the invention may also integrate one or more hybrid lasers, such as lasers having a gain medium made of III-V semiconductor materials on a silicon substrate.

Such a chip may for example be intended to provide a comb of wavelengths emitted by a plurality of hybrid lasers to another photonic chip, or to constitute a photonic integrated circuit of emitter-receiver type coupled to an array of optic fibres, or to emit one or more light beams in free propagation.

PRIOR ART

Photonic chips including a photonic integrated circuit are generally manufactured on SOI (Silicon On Insulator) substrates for integrated photonic technology on silicon or on substrates made of indium phosphide (InP) or gallium arsenide (GaAs) for so-called III-V integrated photonic technology.

In on-silicon integrated photonics, a hybrid III-V/silicon light source is formed by the stacking on a SOI substrate of III-V layers constituting the gain material of a laser. The light emitted in the gain material is coupled with a light guiding structure formed in the superficial silicon layer of the SOI substrate, underlying the III-V layers.

The light guiding structure accommodates the silicon photonic components, such as passive components (for example wave guides, optical multiplexers/demultiplexers, resonant rings) and active components (for example modulators formed by P and N dopings of the superficial silicon layer, or/and photodetectors for example formed by epitaxy of germanium on silicon).

In order to be able to extract light from the photonic chip in the direction of an external device such as an optic fibre, the component the most commonly used in silicon photonics is the surface grating coupler. Such a coupler makes it possible, on the one hand, to adapt the size of the optic mode propagating in the wave guides of the photonic chip to the size of the optic mode propagating in the standard single-mode fibres, that is to say a diameter of 9.2 μm, and, on the other hand, to pass from a propagation guided in the plane of the photonic chip to a propagation in free space quasi-vertical to the plane of the chip and on the side opposite to the substrate of the chip. This is obtained by etching an array in the superficial silicon layer. Such a component is for example described in: "Apodized Waveguide Grating Couplers for Efficient Coupling to Optical Fibers", IEEE PHOTONICS TECHNOLOGY LETTERS, VOL. 22, NO. 15, Aug. 1, 2010, of Xia Chen et al. The surface coupling array constitutes a first type of vertical coupler.

In silicon technology, this component thus makes it possible to couple the light of a waveguide in the plane of the photonic chip to a cleaved single-mode fibre forming an angle with the vertical, commonly around 8° in a material made of glass (i.e. around 11° in air). Its optic losses are from 1 to 4 dB when the geometric alignment between the surface grating coupler and the single-mode fibre is optimal. The coupler fibre alignment tolerance, characterised as the radial misalignment with respect to the optimum alignment that generates 1 dB of additional losses, is around 2 μm.

It is also to be noted that the spectral pass band of a surface grating coupler (characterised as the band for which losses are limited, for example less than 1 dB) is narrow, generally less than 30 nm. This is a very restrictive point for example in coarse wavelength division multiplexing (CWDM) applications for which several wavelengths (for example four wavelengths) spaced apart by 20 nm have to be multiplexed and transmitted in a single fibre. The light signal has in this example a spectral band of 4×20 nm and the losses at the extremities of the band are then increased by several dB compared to the losses at the centre of the band. As an example, the transmission losses of a surface grating coupler are 2.7 dB at the central wavelength 1290 nm, whereas they are 5.5 dB at the wavelength 1330 nm spaced 2*20 nm from the central wavelength 1290 nm.

To resolve this problem, relatively complex surface grating couplers have been proposed, which require an additional structured silicon nitride layer above the structured silicon layer. Reference may be made to the article of Sacher, Wesley D., et al. entitled "Wide bandwidth and high coupling efficiency Si3N4-on-SOI dual-level grating coupler", Optics Express 22.9 (2014): 10938-10947. Furthermore, this type of solution only works for polarised light (for example TE), but no solution has been proposed making it possible to couple any polarisation light in the photonic chip.

Only solutions of butt coupling the chip make it possible to increase the spectral band of the optical coupling while working for light of any polarisation. Such a butt coupler is for example described by B. Ben Bakir et al. in "Low loss (<1 dB) and Polarization-Insensitive Edge Fiber Couplers fabricated on 200 mm Silicon-on-Insulator wafers", PTL 2009. The 'horizontal' coupler thus has a mode size Do of around 3 μm. It is indispensable to use opposite a fibre provided with a microlens of identical mode diameter. The alignment tolerance between this fibre and the photonic chip is much less than 1 μm.

In FIG. 1 is represented a schematic sectional view of a photonic chip integrating a hybrid laser structure with III-V semiconductors on silicon on insulator substrate. The photonic chip includes a light guiding silicon layer 12 supported by a silicon substrate 10 and covered by a first layer 13, generally made of $SiO_2$, serving as bonding interface between the III-V semiconductor stack and the silicon guiding layer. This layer 13 is optional and bonding with the III-V stack may also be done directly. The light guiding layer 12 bears the photonic components (waveguide, surface grating coupler, PN modulator, etc.). The light guiding layer 12 is separated from the silicon substrate 10 by a buried oxide (BOX) layer 11.

The photonic chip integrates a hybrid laser LA with III-V semiconductors on silicon. The laser LA comprises a gain structure on the first layer 13. The gain structure includes a stack S of layers of III-V materials of which the N and P layers are in contact with the electrodes E. The laser LA is encapsulated in a second so-called encapsulation layer 14, for example made of silicon oxide or silicon nitride. The encapsulation layer 14 includes the electrodes E of the laser as well as the metal levels for electrical interconnection with the active components of the layer 12 (such as the modulator) of the photonic chip. This layer is known by the name "Back End Of Line" (BEOL) in manufacturing methods used in microelectronics.

The photonic chip thus has a front face F1 on the encapsulation layer side 14 and a rear face F2 on the substrate side 10. The light guiding layer 12 includes a light guiding structure 121 optically coupled to the laser to receive, filter and guide the light emitted by it. The light guiding layer 12 also includes a surface grating coupler 122 configured to receive light from the light guiding structure 121 and to form from it a light beam directed in the direction of the front face F1 of the photonic chip.

The light guiding structure includes the different photonic components, passive or active, up to the input/output port constituted by the surface grating coupler 122. It notably includes a waveguide 121 and the surface grating coupler 122, with the surface grating coupler 122 here represented along a longitudinal section, the light propagating in this waveguide in the plane of the figure, for example in the direction x when it involves here in FIG. 1 extracting the light from the photonic chip with the surface grating coupler 122.

The encapsulation layer 14 generally includes metal levels for electrical interconnection of the photonic chip. This layer is thus constituted of dielectric materials and etched lines of metal. An electronic chip intended to control or to read the active photonic components of the photonic chip (modulators, photo-detectors) is generally transferred onto the front face F1 of the photonic chip.

In order to increase the alignment tolerance between the surface grating coupler and an optic fibre and thereby make the alignment operations less complex and notably to be able to be produced according to less expensive passive alignment techniques, it has been proposed in the article of S. Bernabé et al., "On-Board Silicon Photonics-Based Transceivers With 1-Tb/s Capacity", in IEEE Transactions on Components, Packaging and Manufacturing Technology, vol. 6, no 7, July 2016, to resort to a system of two lenses composed of a first lens integral with the photonic chip and a second lens integral with the optic fibre. The first lens of thickness Th makes it possible to expand the mode size of the optic beam at the output of the chip, for example from $Do=9.2$ µm to $Di=100$ µm and to collimate the beam of expanded mode size, incident on it. The second lens makes it possible to increase the mode size of the single-mode fibre from 9.2 µm to a mode size adapted to the first lens, here 100 µm. This system may exploit a lens connector in which is inserted the optic fibre, hence positioning it vis-à-vis the second lens. The first lens must for its part be aligned with the photonic chip in a very precise manner, then must be made integral therewith. The alignment tolerance between the chip+first lens assembly and the second lens+fibre assembly is then increased to +/− 20 µm.

In order to expand and collimate a light source of wavelength λ and of mode size $Do=2*wo=9.2$ µm at the output of the surface grating coupler, the first lens has to have a focal length in air equal to Fair=Di. (π. wo/2λ), Di being the size of the expanded beam at the output of the first lens. To obtain an expanded collimated beam with a diameter Di of around 100 µm, and making by simplification the hypothesis of an output angle of the surface grating coupler with respect to the vertical of 0°, the lens, convex, made of silica glass of index 1.45 at the wavelength 1.31 µm, has to have a thickness of around 860 µm, corresponding to a focal length in air of around 600 µm.

It cannot be envisaged to arrange such a thickness of glass between the surface grating coupler 122 and the front face F1 of the photonic chip. Indeed the encapsulation layer 14 generally has a thickness of only around 3 µm. The lens thus cannot be integrated at the level of this encapsulation layer 14 but has to be transferred onto the front face of the photonic chip in a very precise manner (the alignment tolerance being of the order of 2 µm) before being made integral therewith.

This making integral may be achieved by means of copper micro-pillars, the interstice between the lens and the photonic chip being filled by a filling layer made of a polymer material. The filling layer lies on the optical path of the light beam between the surface grating coupler and the lens, and generates additional losses.

For beams of expanded mode size (here to 100 µm), losses increase significantly with the angular misalignment between the axis of the beam of the 'coupler+first lens' assembly and the axis of the beam of the 'fibre+second lens' assembly (angular deviation between the axes of the beams of the 2 assemblies). A vertical angle (perpendicular to the faces of the chip F1 and F2) for the beam at the input/output of the chip would make it possible to reduce considerably the angular misalignment and thus the optical losses.

Finally the spectral band of a light beam at the input or at the output of such a photonic chip with surface grating coupler/lens system is around 30 nm, which does not make it possible to implement for example this solution with multiplexing on a band of 80 nm of 4 wavelengths of CWDM type.

In III-V integrated photonics, a light source is directly constituted on the substrate, in a guiding layer made of III-V material. The guiding layer may include waveguides, passive components such as wavelength multiplexers/demultiplexers, and active components such as modulators. The light may be extracted from the III-V photonic chip by the butt, at the output of the waveguide, or through the rear face of the chip by obliquely faceting the waveguide, the faceting of the guide playing the role of mirror with angle transmission. A guide provided with a tilted facet thus constitutes a second type of vertical coupler. This type of vertical coupler may be associated with a lens manufactured on the rear face of the photonic chip, as described by K. Adachi et al. in "Emission Beam Engineering of 1.3-µm High-power DFB Laser Using Monolithically-integrated Mirror and Lens for Silicon Photonics", ECOC 2016.

This lens makes it possible to collimate the beam after reflection on the tilted facet, and to expand the mode size of the beam to around 10 µm (the thickness of the InP substrate is around 100 µm). This lens has a curved surface, the thickness of which varies continually. The profile of this surface is thus qualified as analogue. The manufacture of such an analogue profile by etching exploits a technique of resin flow lithography (the resin can then only have a symmetrical shape) or so-called "Grey tone" lithography, which has the drawback of being difficult to calibrate to obtain the desired analogue shapes.

With such a solution, to obtain a coupling angle perpendicular to the rear face of the chip, it is obligatory to tilt the facet with an angle of exactly 45°. This is difficult to achieve, notably if resort is made to anisotropic etchings using the crystalline planes of silicon or InP crystals.

Furthermore, to obtain a coupling angle which corresponds to that of a surface grating coupler arranged on a silicon photonic chip arranged opposite the III-V photonic chip to receive the laser beam, Adachi et al. propose the combination of a faceting of the waveguide at an angle greater than 45° and a displacement of the lens that receives the reflected beam such that the centre of the lens is offset from the centre of the beam. By offsetting the lens in this way, a non-zero coupling angle may thus be obtained, but focusing is partially lost as witnessed by far field radiation diagrams.

In the U.S. Pat. No. 8,515,217, it has been proposed to position a lens on the rear face of a substrate, opposite a waveguide terminating by a tilted facet covered with a mirror (vertical coupler of faceted waveguide type), and orienting the beam to the rear face of the chip. The lenses used are so-called analogue Fresnel lenses. A Fresnel lens replaces the curved surface of a conventional lens by a series of concentric rings of prismatic sections that are different from one ring to the next. The thickness of a Fresnel lens is thus decreased compared to a conventional lens, but its manufacture remains difficult. It requires an analogue saw tooth structuring, making it possible to define ridges with variable slopes, generally produced by the "Grey tone" lithography technique. Such a Fresnel lens remains furthermore sensitive to Fresnel reflections. Finally, such a lens is sensitive to the polarisation of the light on account of the rings. Indeed, the electric field of the optic wave may take any orientation in the plane of the chip and the indices seen by the wave, at the wavelength scale, differ depending on the orientation of the electric field.

DESCRIPTION OF THE INVENTION

The aim of the invention is to provide a photonic chip with means able to expand and collimate an optic beam at the output of the photonic chip (and vice-versa to adapt the mode size of an optic beam at the input of the photonic chip to that of a vertical coupling structure of the photonic chip, and to focus the beam on the vertical coupling structure), this beam being potentially rectified (or deviated) with respect to its axis before crossing said means, and potentially with expanded spectral band.

To do so it proposes a photonic chip including a light guiding layer supported by a substrate, a front face on the light guiding layer side, a rear face on the substrate side, a lens integrated at the level of the rear face and, in the light guiding layer, a vertical coupler and a light guiding structure optically coupled to the vertical coupler, the vertical coupler being configured to receive/transfer light from/to the light guiding structure and form/receive a light beam in the direction of/from the lens. The lens includes a plurality of trenches made in the rear face, the trenches delineate a two-dimensional array of posts and each post has, in a direction orthogonal to the front and rear faces, an invariable thickness.

Certain preferred but non-limiting aspects of this chip are the following:

the substrate has a thickness Th, the light beam forms an angle $\Theta 2$ with an axis perpendicular to the front and rear faces and the lens has a centre and a median axis orthogonal to the front and rear faces passing through its centre, the median axis of the lens and an axis orthogonal to the front and rear faces passing through the centre of the vertical coupler being offset by a distance Th*tan $\Theta 2$;

the substrate has an effective index n10, the light has a wavelength $\lambda$, the light beam formed/received by the vertical coupler has a mode size Do=2.wo and the posts form a two-dimensional array of characteristic dimension greater than or equal to Th×2$\lambda$/($\pi$. wo×cos $\Theta 2$. n10);

the two-dimensional array includes elementary cells repeating periodically, each elementary cell including a post and the dimensions of the posts being modulated from one elementary cell to the next;

the lens has a circular symmetry around its median axis, the posts equidistant from the median axis being of identical size;

the lens has a circular symmetry around the axis orthogonal to the front and rear faces passing through the centre of the vertical coupler, the posts equidistant from said orthogonal axis being of identical size;

the lens has a circular symmetry around an axis of symmetry orthogonal to the front and rear faces, the axis of symmetry passing in the plane of the lens at a point situated between the centre of the lens and the projection of the centre of the vertical coupler, the posts equidistant from the axis of symmetry being of identical size;

the posts are parallelepiped or cylindrical;

the lens is a Fresnel lens;

it further includes a mirror arranged on the rear face to reflect light from/to the lens;

the vertical coupler is a tilted facet waveguide or a surface grating coupler;

the surface grating coupler is conformed to receive/transfer light from/to the light guiding structure and form/receive a light beam of mode size less than 12 µm, preferably less than 6 µm, in the direction of/from the lens.

The invention also pertains to a photonic chip including an active photonic component, electrical interconnections to the active photonic component and an electronic chip transferred onto the rear face of the photonic chip and connected to the electrical interconnections. It also relates to a photonic chip with integrated hybrid laser optically coupled to another photonic chip conforming to the invention.

BRIEF DESCRIPTION OF THE DRAWINGS

Other aspects, aims, advantages and characteristics of the invention will become clear from reading the detailed description according to the preferred embodiments thereof, given by way of example and non-limiting, and made with reference to the appended drawings in which:

FIG. 9 illustrates an alternative embodiment of a photonic chip conforming to FIG. 3;

FIGS. 11a-11g illustrate an exemplary embodiment of the photonic chip of FIG. 5;

DETAILED DESCRIPTION OF PARTICULAR EMBODIMENTS

The invention pertains to a photonic chip being able to supply (respectively receive) at the output (respectively at the input) of the photonic chip a collimated optic beam, of preferentially expanded mode size.

Figure 1:
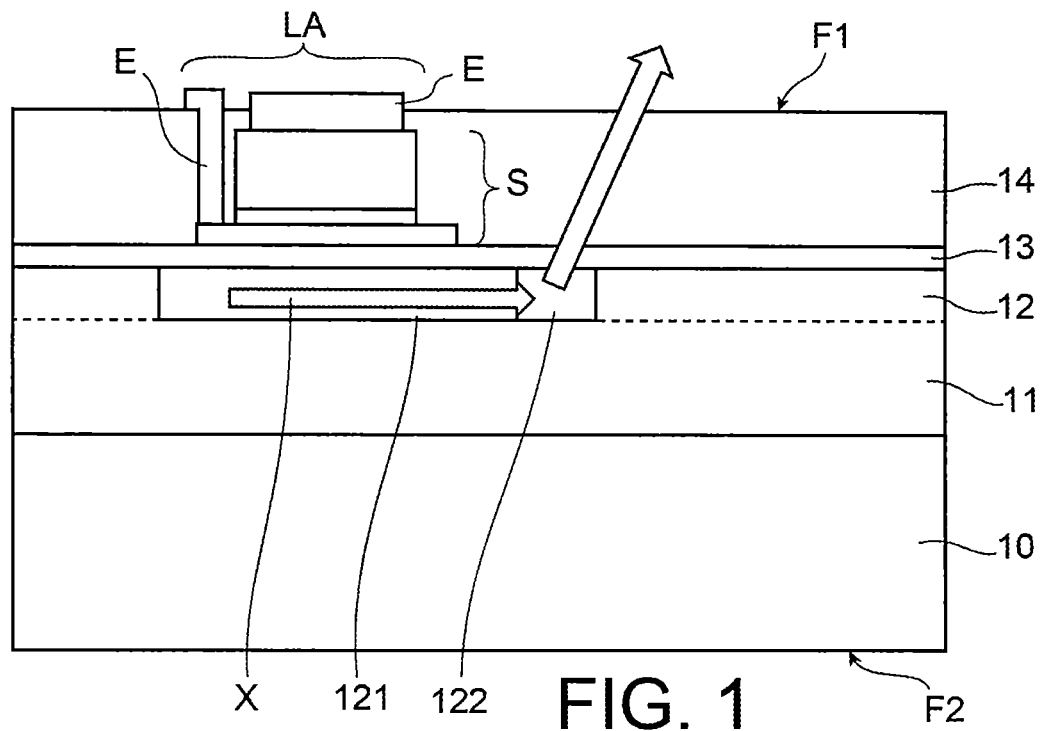
FIG. 1, already discussed previously, is a schematic section of a photonic chip integrating a hybrid laser structure with III-V semiconductors on silicon.
Figure 2:
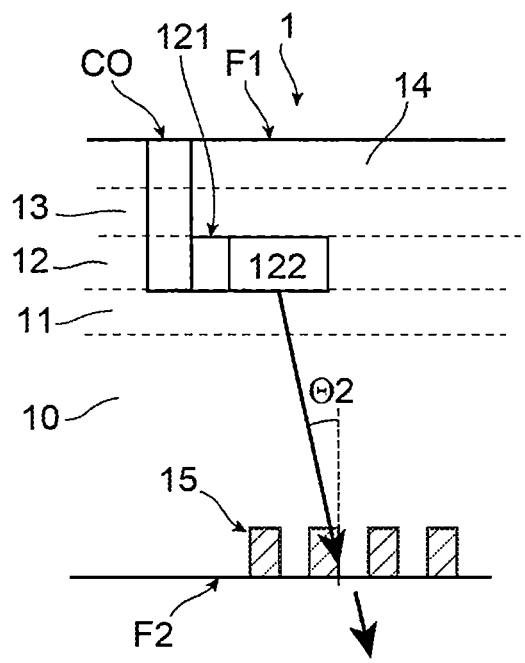
FIGS. 2 and 3 are schematic sections of photonic chips according to the invention having a collimation structure integrated on the rear face and a vertical coupler directing the light in the direction of the collimation structure on the rear face.
Figure 3:
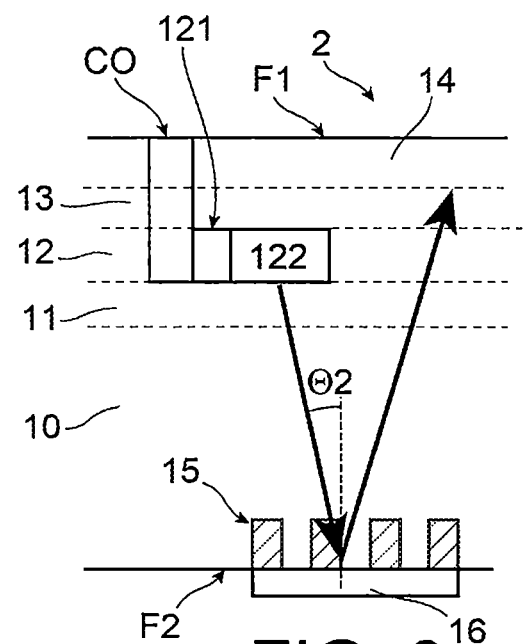

The chip comprises a substrate, for example a substrate made of silicon, InP or AsGa. With reference to FIGS. 2 and 3 describing the example of a silicon technology chip, the photonic chip 1, 2 includes a light guiding layer 12 supported by a substrate 10 and covered by an optional silicon oxide layer 13 (serving for example as bonding interface between the substrate and a III-V laser stack). The light guiding layer may include a crystalline silicon sub-layer (the silicon of a SOI substrate), as well as a sub-layer made of amorphous silicon and/or a silicon nitride sub-layer. A layer made of dielectric material 11 is intercalated between the light guiding layer 12 and the substrate 10. This layer 11 may also include metal levels for interconnecting with the active optical components of the layer 12.

The photonic chip 1, 2 may integrate one or more optical components CO, active or passive. The light guiding layer 12 includes a light guiding structure 121 made of silicon optically coupled, on the one hand, to the component(s) CO and, on the other hand, to a vertical coupler 122 in the light guiding layer. CO may be an assembly of components: for example a laser+a modulator, coupled to 121, then 122. The chip may comprise a plurality of CO, 121, 122, 15.

The optical component CO may be a photodetector made of germanium material embedded in the layer 12. In this case, the photonic chip may be a receiver intended to receive an optic beam of which it is wished to detect the intensity on the photodetector CO.

The optical component CO may also be a hybrid laser with III-V semiconductors on silicon which includes a gain structure made of III-V materials on the interface layer 13, or directly in contact with the light guiding layer 12. The gain structure includes for example a stack of layers of III-V materials and two electrodes for forming electrical contacts on the gain structure. The laser LA may be encapsulated in a second encapsulation layer 14, for example made of silicon oxide, silicon nitride or a mixture of silicon oxide and silicon nitride, or in a BCB type polymer. The photonic chip thus has a front face F1 on the second encapsulation layer side 14 and a rear face F2 on the substrate side 10.

Within the scope of the invention, the vertical coupler 122 is configured to receive light from the light guiding structure 121 and to form therefrom a light beam directed to the rear face F2 of the photonic chip. This configuration of the vertical coupler 122 thus enables light to traverse the entire thickness of the substrate 10. The vertical coupler 122 is for example a surface grating coupler or a tilted facet waveguide. For a surface grating coupler, the mode size Do is 9.2 µm, adapted to the mode size of a single-mode fibre. For a silicon tilted facet waveguide, the mode size Do is typically 3 µm.

The photonic chip 1, 2 further comprises a collimation structure of lens type 15 integrated at the level of the rear face F2. The vertical coupler 122 is configured to direct the light beam to the collimation structure 15 integrated at the level of the rear face F2. The collimation structure 15 is configured to collimate a light beam incident on said structure from the vertical coupler 122, the focal point of the collimation structure 15 corresponding to the centre of the vertical coupler 122, and to expand the mode size of this beam to an expanded mode size Di after crossing the substrate.

In a preferential alternative embodiment of the invention making it possible to obtain a photonic chip with inputs/outputs of collimated light beams not only with expanded mode size but also with expanded spectral band, the vertical coupler 122 is a surface grating coupler designed to be adapted to a reduced mode size (for example 3 µm) compared to that of a single-mode fibre (typically 9.2 µm). In this alternative, the surface grating coupler is thereby conformed to receive/transfer light guided from/to the light guiding structure 121 and to form/receive a light beam of mode size less than 6 µm in the direction of/from the collimation structure.

It should be noted that such a design of the grating coupler is not exclusive of the chip according to the invention with rear face integrated collimation structure, but may find application in any photonic chip where such a coupler receives/transfers light guided from/to a waveguide to form/receive a collimated light beam with mode size that is reduced, equal or expanded, notably in a photonic chip with collimation structure integrated or assembled on the front or rear face, and more specifically in a photonic chip integrating one or more components such as hybrid lasers on silicon, modulators, photodetectors, or a chip carrying out a wavelength multiplexing/demultiplexing for which a wide spectral band is necessary.

The following equation illustrates the dependence of the angle θ of emission of light by a surface grating coupler with the wavelength λ of the light:

$$\frac{1}{\lambda}[-n_{11}\cdot\sin\theta+n_{\textit{eff}}]=\frac{1}{\Lambda},$$

where $n_{11}$ is the index of the dielectric layer 11, $n_{\textit{eff}}$ is the effective index of the light guiding layer 12 and $\Lambda$ is the pitch of the array. By deriving this equation with respect to $\lambda$, the following equation is obtained:

$$\frac{d\theta}{d\lambda}=\frac{1}{\Lambda}\frac{1}{n_{11}}.$$

By reducing the mode size $Do=2*w_o$ of the beam at the input/output of the surface grating coupler and in the direction of/from the collimation structure, the numerical aperture NA is increased, and thus the angle $\Phi$ of the light beam at the output of the array:

$$w_o=\lambda\cdot\frac{\pi}{NA} \text{ with } NA=n_{11}\cdot\sin\left(\frac{\Phi}{2}\right).$$

An expanded angle $\Phi$ contains more wavelengths in phase condition. By arranging a suitable lens opposite this array, the spectral band of the "surface grating coupler/lens" system is considerably expanded. Taking the example of an array with mode size reduced to Do=3 µm, the spectral band is thereby expanded to around 100 nm, at the spot where it is only 32 nm for an array with standard mode size of 9.2 µm.

A surface grating coupler with reduced mode size physically differs from a standard coupler in that it is shorter (in the direction of light propagation), narrower (orthogonally to the direction of light propagation), and in that the etching depth of the lines of the coupler is greater, as exemplified from an approximate calculation.

| Mode size | Length of the coupler | Width of the coupler | Etching of the coupler Thickness of non-etched Si/thickness of Si in the trenches of the surface grating coupler |
|---|---|---|---|
| Standard: 2.wo = 9.2 µm | ~30 µm | ~10 µm | 300 nm/150 nm |
| Reduced: 2.wo = 3 µm | ~10 µm | ~3 µm | 300 nm/50 nm or 300/0 nm |

The surface grating coupler may be produced according to other alternatives, but it is physically characterised by a reduced mode size of the beam at its output (Do<6 µm) compared to the surface grating coupler known and used in the field (Do=9.2 µm).

Opposite this coupler, the light beam traversing a silicon substrate 10 of 775 µm thickness is very divergent, but by associating it with the lens 15, it may be collimated, and have a mode size of 120 µm (instead of 40 µm using a standard grating coupler). The alignment tolerance of this lens with respect to such a surface grating coupler is reduced, going from +/−2 µm for a surface grating coupler of standard mode size of 9.2 µm to +/−0.5 µm for a surface grating coupler of mode size of 3 µm. But such a reduced alignment tolerance can be attained since the alignment is realised in lithography.

The photonic chip with rear face integrated collimation structure may be intended to be optically coupled to another external device arranged opposite the chip, for example a photonic chip, a device including one or more optic fibres, this device comprising at least one optic input and/or one output of mode size equivalent to the output of the collimation structure 15 integrated in the chip 1, 2. In the case of a coupling with single-mode fibres, they are for example for the external device so-called "expanded beam" connectors making it possible to go from a mode size of 9.2 µm (that of single-mode fibres) to a mode size expanded to 50-500 µm.

The photonic chip with rear face integrated collimation structure may also be used to emit in a medium when it integrates a laser, for example for LIDAR (Light Detection and Ranging) applications, or receive in a medium a non-guided light. In the latter case, the coupler 122 is coupled to the waveguide 121, itself coupled to a photodetector accommodated in the layer 12.

Fresnel losses are observed during the crossing of the interface between the layer 11 and the substrate 10: they are 0.8 dB with a SiO$_2$ layer 11 and a silicon substrate 10. In order to limit these losses, in a possible alternative of the invention, an antireflective layer (for example a silicon nitride layer, of thickness $\lambda/4$ where $\lambda$ corresponds to the wavelength of the light beam) is arranged between the layer 11 and the substrate 10. It is also possible to adopt for material of the layer 11 not SiO$_2$ but a silicon nitride or a stack of a sub-layer of SiO$_2$ and a silicon nitride sub-layer. The losses during the crossing of the interface between the layer 11 and the substrate 10 are thus below 0.5 dB at the wavelength 1.31 µm.

In a first embodiment represented in FIG. 2, the collimation structure is a lens 15 formed on the rear face of the photonic chip 1, the lens 15 collimating the light beam passing through it. The lens 15 is more specifically a so-called digital lens that takes the form of an array of trenches made on the rear face, the trenches delineating a set of patterns and each pattern having, in a direction orthogonal to the front and rear faces, an invariable thickness.

In a second embodiment represented in FIG. 3, the collimation structure is a reflective structure that is structured in such a way as to collimate the light beam reflecting thereon. Such a reflective structure is a reflective lens produced by forming a digital lens 15 as in the first embodiment and by covering it with a metal layer 16, for example a layer of gold, silver or aluminium. The metal layer 16 may be localised or cover the entire rear face.

The reflective lens 15, 16 of FIG. 3 makes it possible to send the collimated beam back to the front face F1. This configuration is particularly interesting in the case where it is wished to transfer an electronic chip onto the rear face F2 of the photonic chip. In this case, the rear face F2 of the photonic chip is not accessible, and the reflective lens 15, 16 then makes it possible to recover the collimated beam on the side of the front face F1.

Figure 4A:
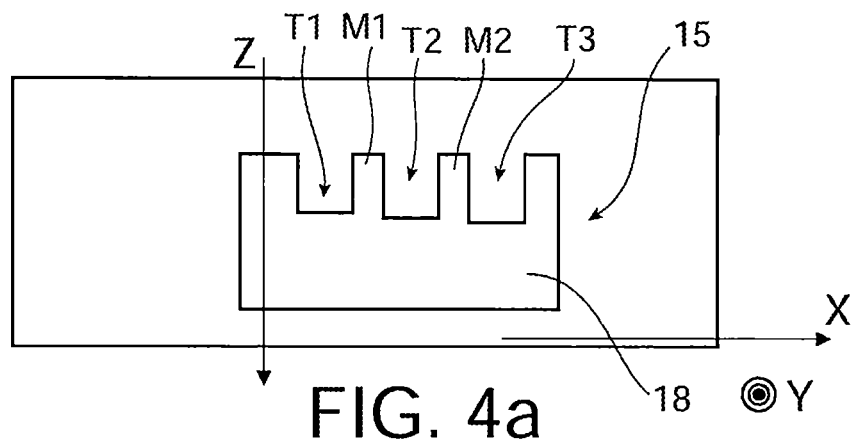
FIGS. 4a, 4b and 4c are diagrams of lenses produced by etching according to etching modes called respectively digital (FIG. 4a) and analogue (FIGS. 4b and 4c) in the description of the invention.
Figure 4B:
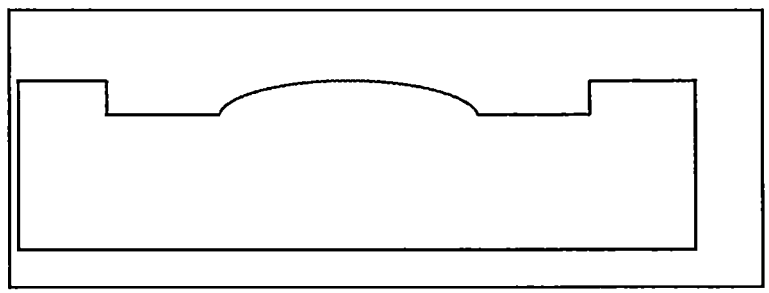
Figure 4C:
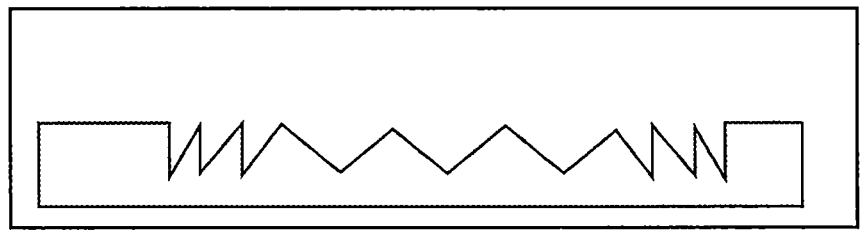

The so-called digital lenses used in the invention which may be manufactured by means of standard manufacturing steps (lithography/etching) giving rise to "digital" structurings (cf. FIG. 4a where a numerical 1 corresponds to an etching of a trench T1, T2, T3 and a numerical 0 corresponds to an absence of etching that defines a pattern M1, M2 of invariable thickness) may be distinguished from lenses which require an "analogue" structuring to define patterns of variable thickness, for example a spherical dioptre (FIG. 4b) or ridges of variable slopes (FIG. 4c). Such an analogue lens is generally obtained by a resin flow lithography technique or by so-called "Grey tone" lithography.

With reference to FIG. 4a, the digital lens 15 thus includes a plurality of trenches T1, T2, T3 made on the rear face F2 of the substrate 10, the trenches delineating a set of patterns M1, M2 and each pattern having, in a direction orthogonal to the front and rear faces, an invariable thickness. In a favoured embodiment, the patterns all have the same thickness. The invention extends however to patterns having different thicknesses, and more specifically to patterns divided up into a first set of patterns having a first thickness and a second set of patterns having a second thickness. The first thickness may be greater than the second thickness, and the patterns of the first set may be wider patterns than the patterns of the second set.

The thickness of the patterns is typically defined by an etching depth of the trenches. The patterns are constituted of the material of the substrate. Alternatively, or as a complement, they may be constituted of the material of an additional layer transferred onto the rear face of the substrate. This additional layer is for example made of deposited amorphous silicon or crystalline silicon, or any other material with high index in contrast with that of air or of the material that fills the trenches.

Figure 5A:
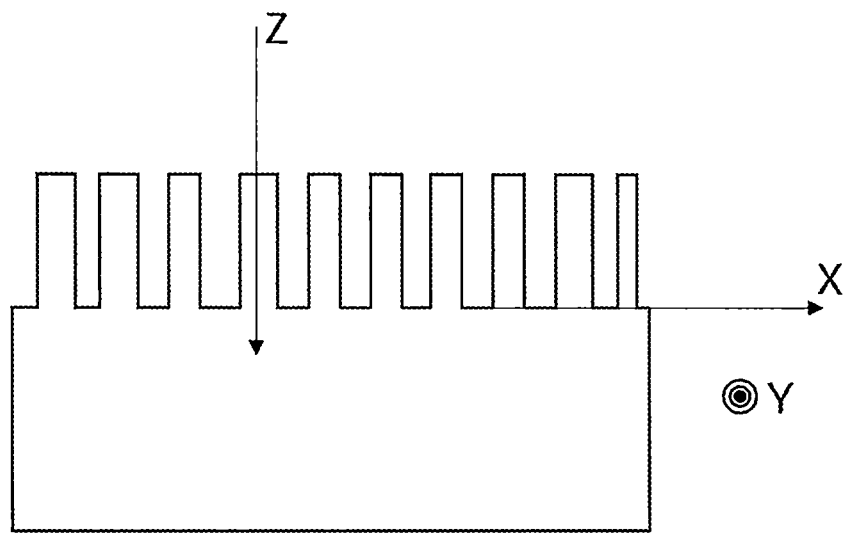
FIGS. 5a and 5b illustrate different alternative embodiments of a collimation structure that can be integrated in a chip according to the invention.

With reference to FIG. 5a, each trench has a depth along the direction orthogonal to the front and rear faces (direction z). The trenches separate the patterns of invariable thickness that form a two-dimensional array, for example a square or circular array. This array has a characteristic dimension (side in the case of a square array, diameter in the case of a circular array) greater than or equal to Th×2λ/(π. wo×cos Θ2. n10).

Figure 5B:
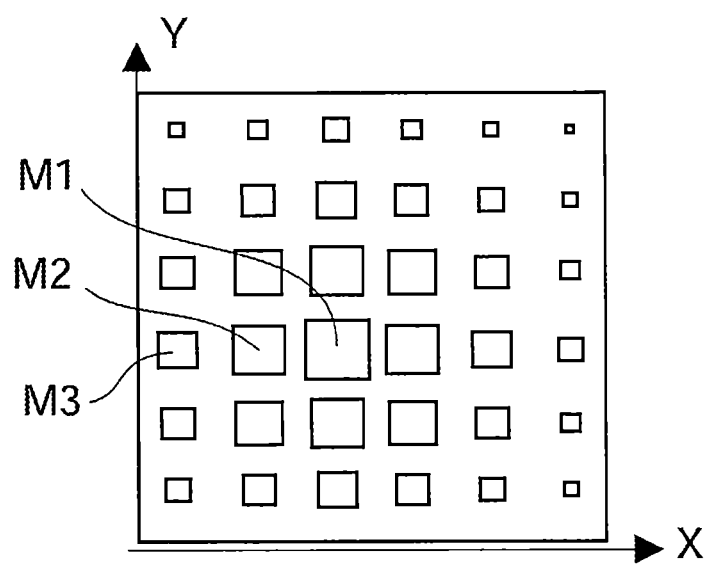
Figure 6B:
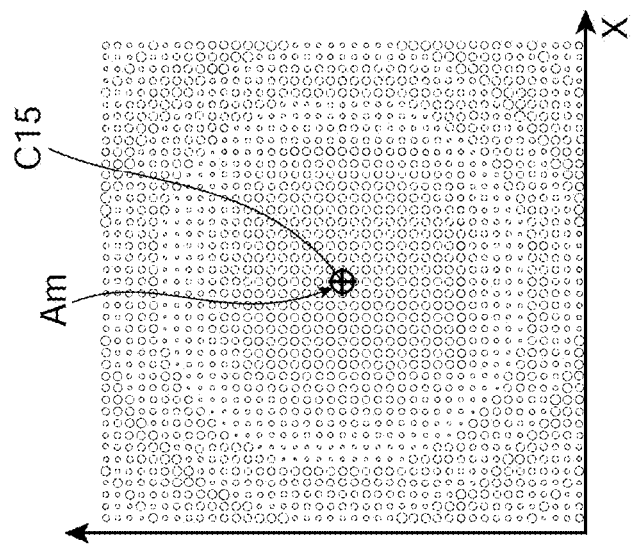
FIGS. 6a and 6b illustrate the dimensioning of a collimation structure that can be integrated in a chip according to the invention and which does not introduce any deviation of the beam on crossing the collimation structure.
Figure 7B:
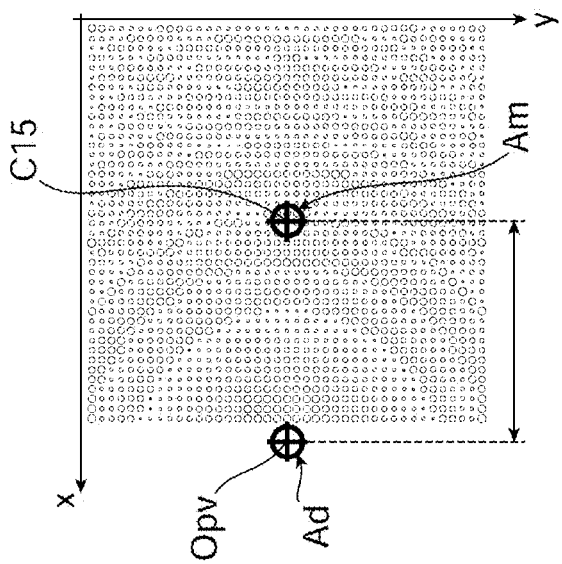
FIGS. 7a and 7b illustrate the dimensioning of another collimation structure that can be integrated in a chip according to the invention, said structure introducing a deviation of the beam on crossing the collimation structure.

As represented in FIGS. 5b, 6b and 7b, the patterns may form a matrix array of posts of section (in the plane (xy)) that is square or rectangular (FIG. 5b), or circular (FIGS. 6b and 7b). The patterns may notably be arranged in circular symmetry around an axis of symmetry not necessarily merged with the median axis of the lens passing through its centre. These latter shapes, unlike rings, enable insensitivity to polarisation. Indeed, the electric field of the optic wave may take any orientation in the plane (xy) and the indices seen by the wave, at the wavelength scale, are identical whatever the orientation of the electric field.

The refractive index of the trenches T1-T4 is less than the refractive index of the patterns. In this way, the lens forms a refractive index pseudo-gradient structure able to collimate to the exterior an incident curved wave front from the vertical coupler 122 (and vice-versa to generate a curved phase shift of an incident flat wave front from the exterior). More specifically, the patterns are formed in a core material of refractive index nc, and the trenches are left in air or filled with a filling material of refractive index nr less than the refractive index nc of the core material, for example made of $SiO_2$. The difference between the refractive indices of the core and the trenches is preferably at least equal to 0.2.

Index pseudo-gradient is taken to mean within the scope of the invention that the digital lens does not comprise a true variation profile of refractive index of the core material as is the case of so-called "graded-index structures", but that it has the same properties. Thus, during its passage in the digital lens, the light encounters the equivalent of an analogue lens.

The trenches may be arranged periodically, the width of the trenches separating two contiguous patterns being modulated from one trench to the next. In this way, the material fill factor of the core layer (which defines the local refractive index) changes along the lens.

Taking the example of a matrix array of cylindrical posts (cf. FIGS. 6b and 7b), this array includes a set of square elementary cells of same size, there is one post per cell and the surface area of the posts is modulated from one cell to the next. The fill factor may then be expressed as the ratio between the surface area of a post and the surface area of the elementary cell. With a square elementary cell of 500 nm sides, the post diameter can vary between 20 nm and 480 nm=500–20 nm.

In an embodiment that will be detailed hereafter, the lens 15 is configured to extract the light traversing it from the vertical coupler 122 along the normal to the rear face F2 of the chip.

Figure 6A:
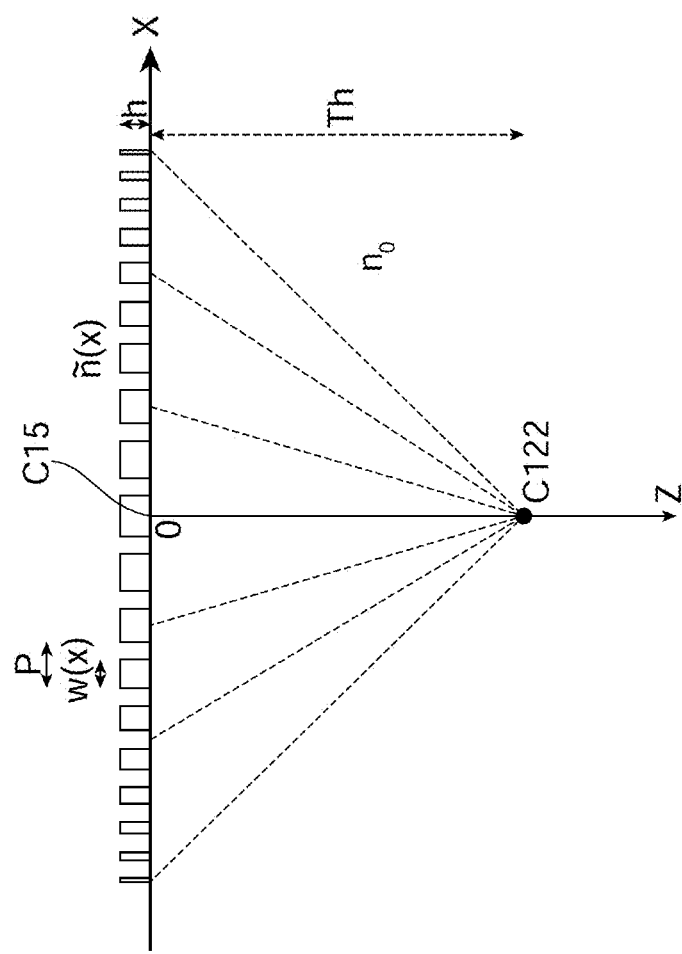

FIG. 6a illustrates the dimensioning of a collimation structure opposite a vertical coupler for which the input/output angle of the optic beam, Θ2=0 (the centre of the vertical coupler represented by the point C122 is then on the axis perpendicular to the plane (x,y) and passing through the centre C15 of the collimation structure (axis called median axis Am of the collimation structure). FIG. 6b relates to a collimation structure of circular symmetry with respect to its median axis, that is to say that in the plane x,y, the patterns of the two-dimensional array that are equidistant from the median axis have an identical surface area (since they are here posts, they have an identical diameter).

Figure 14B:
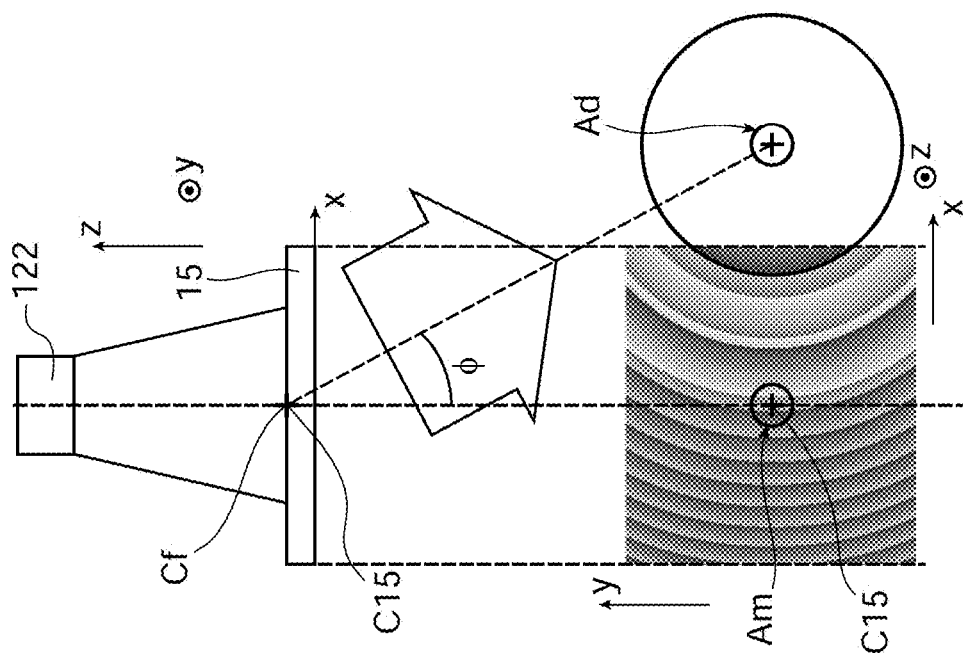
FIGS. 14a and 14b illustrate the layout of the lens vis-à-vis the vertical coupler when the beam at the output thereof is vertical, respectively without and with modification of the angle of the beam.
Figure 14A:
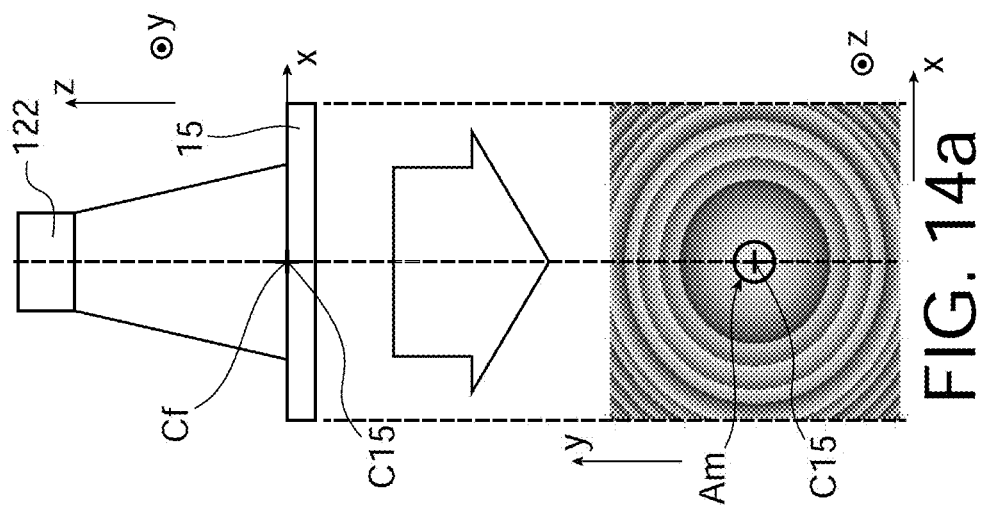

FIGS. 6a-6b illustrate more specifically the dimensioning of a collimation structure not deviating the beam in vertical incidence on this structure, as shown by the equations below describing the geometry of the patterns M1, M2, M3. This configuration is also represented in FIG. 14a.

Figure 7A:
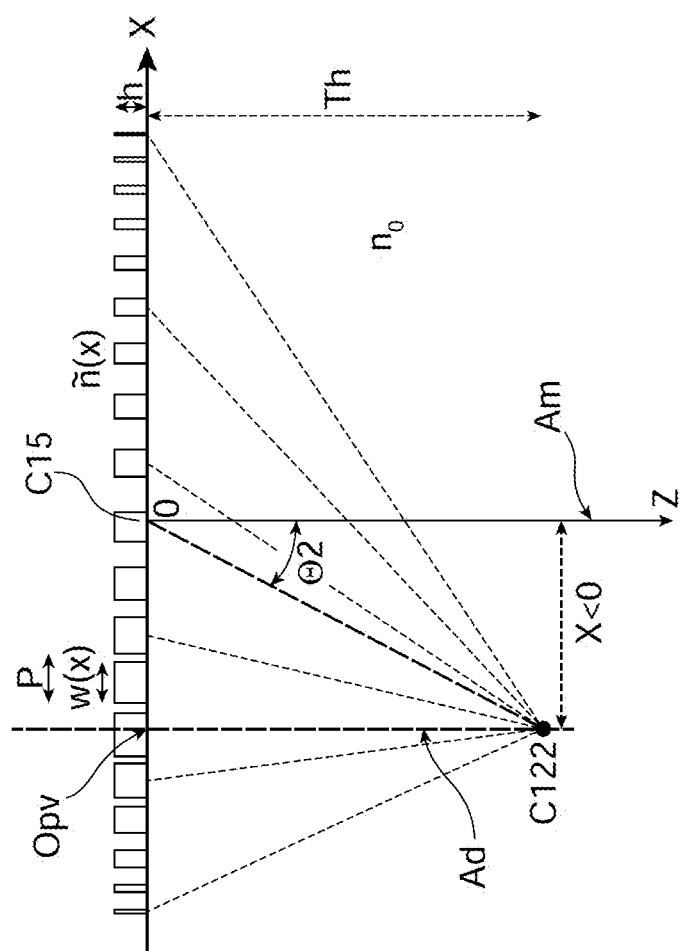

FIG. 7a illustrates the dimensioning of a collimation structure opposite a vertical coupler 122 for which the input/output angle of the optic beam, Θ2≠0 (the orthogonal projection, Opv, of the centre of the vertical coupler C122 on the plane x,y of the collimation structure is then offset by X~Th×tan Θ2 with respect to the centre C15 of the collimation structure (with Th the thickness of the substrate 10). FIG. 7b relates to a collimation structure of which the axis of circular symmetry Ad is offset by X with respect to the median axis Am of the lens. The axis Ad is perpendicular to the plane x,y of the lens and passes through Opv. Seen from above, the lens appears asymmetric.

FIGS. 7a-7b illustrate more specifically the dimensioning of a collimation structure enabling the uprighting of the beam after crossing the collimation structure (ϕ=0), as shown below by the equations describing the geometry of the patterns M1, M2, M3. This configuration is also represented in FIG. 13b.

Figure 13A:
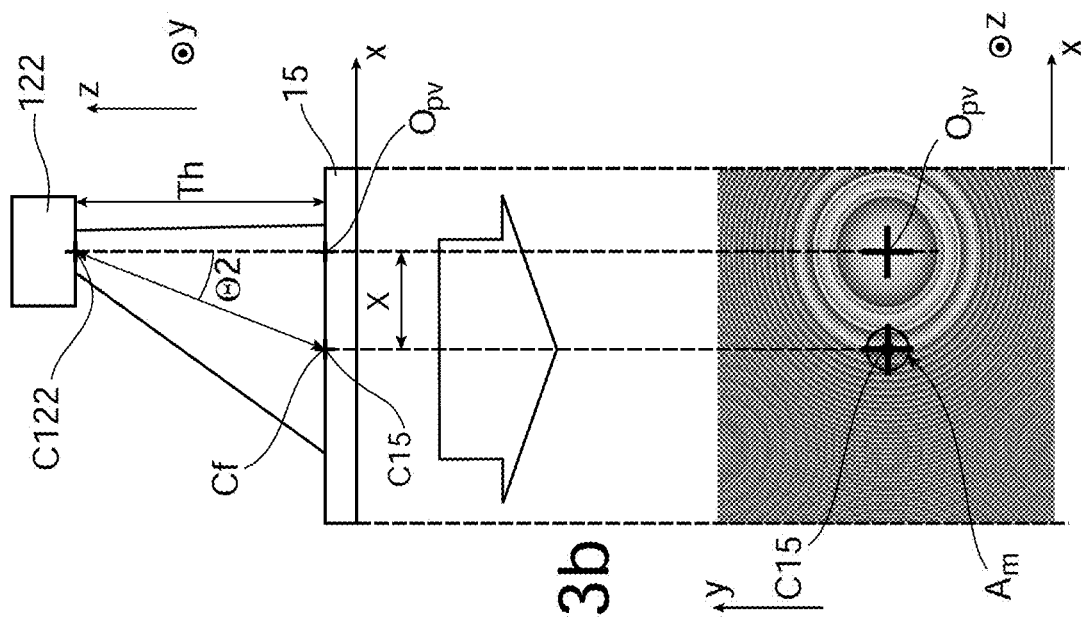
FIGS. 13a and 13b illustrate the layout of the lens vis-à-vis the vertical coupler when the beam at the output thereof forms a non-zero angle Θ2 with the vertical, and relates to a view from above of the collimation structure respectively without and with rectification of the beam.

It is obviously possible to extract a non-vertical collimated beam (Θ2≠0) without uprighting it: a collimation structure of circular symmetry with respect to its median axis is then used, its centre C15 being offset by X=Th×tan Θ2 with respect to the orthogonal projection, Opv, of the centre of the vertical coupler C122 on the plane x,y of the collimation structure, as represented in FIG. 13a. And as represented in FIG. 14b, the lens may be configured to confer, after its crossing, an angle ϕ≠0 to a vertical incident beam. A collimation structure of circular symmetry with respect to an axis Ad, offset from its median axis is then used. The orthogonal projection, Opv, of the centre C122 of the vertical coupler on the plane x, y of the collimation structure is merged with the centre C15 of the collimation structure.

In FIGS. 13a, 13b, 14a and 14b is represented the layout of the lens 15 vis-à-vis the vertical coupler 122. The lens 15 has a median axis Am perpendicular to the plane x,y and passing through its centre C15. The centre C122 of the vertical coupler is at the focal point of the lens. Its orthogonal projection, Opv, on the plane x,y of the collimation structure is distant from the centre C15 by an offset X which can be approximated to Th×tan Θ2. The centre of the beam incident on the plane x,y of the collimation structure from the vertical coupler is designated Cf. The centre Cf of the incident beam is merged with the centre C15 of the collimation structure.

Figure 12A:
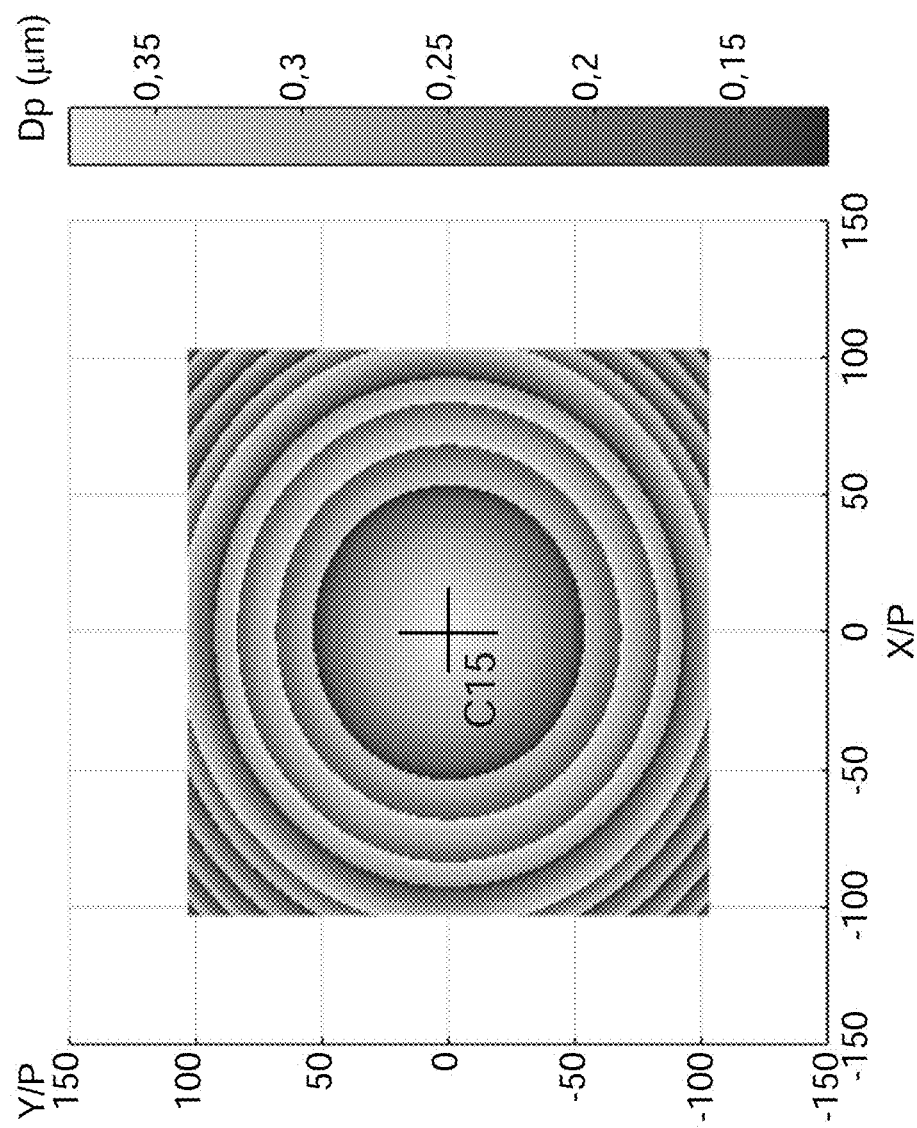
FIGS. 12a, 12b and 12c provide examples of dimensioning of a Fresnel type digital lens, the lens of FIG. 12a not rectifying the light beam at the chip output and the lenses of FIGS. 12b and 12c rectifying the light beam at the chip output.
Figure 12B:
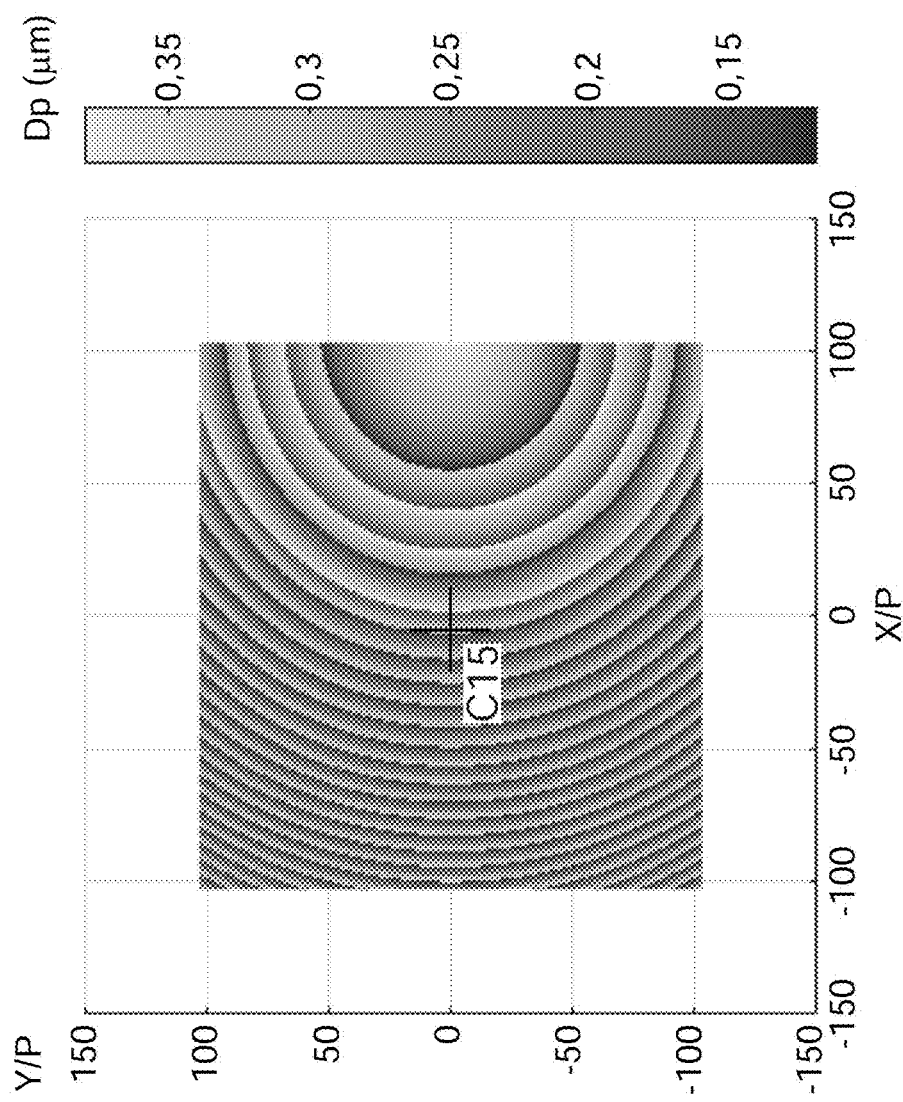
Figure 13B:
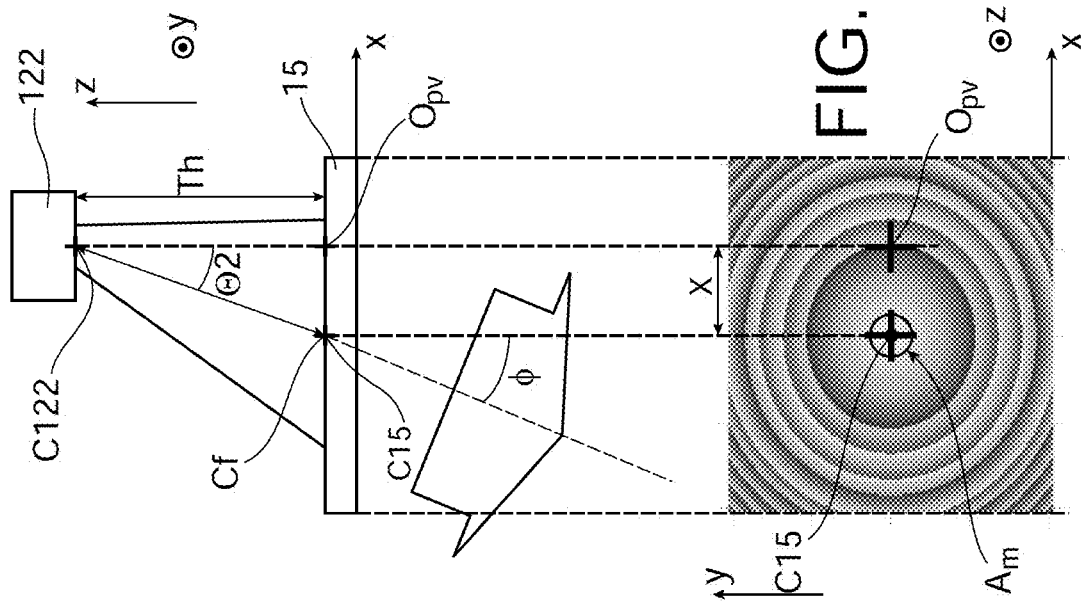

In FIGS. 13a and 13b, the beam at the output of the vertical coupler is not vertical (Θ2≠0°), and the lens carries out or not an uprighting of the beam. In the absence of uprighting (FIG. 13a), the collimation structure has a circular symmetry around an axis of symmetry merged with the median axis Am of the lens (see also FIG. 12a). In the presence of uprighting, that is to say when the angle φ after crossing the structure 15 is zero (FIG. 13b), the collimation structure has a circular symmetry around an axis of symmetry Ad distant from the median axis of the lens, said axis of symmetry being perpendicular to the plane x,y of the lens and passing through the focal point C122 (see also FIG. 12b). The intersection of this axis of symmetry Ad with the plane of the lens is designated $O_{pv}$. Obviously, any variation in intermediate angle between the absence and the presence of uprighting may be realised by offsetting the centre of circular symmetry of the post from C15 to $O_{pv}$.

Figure 15:
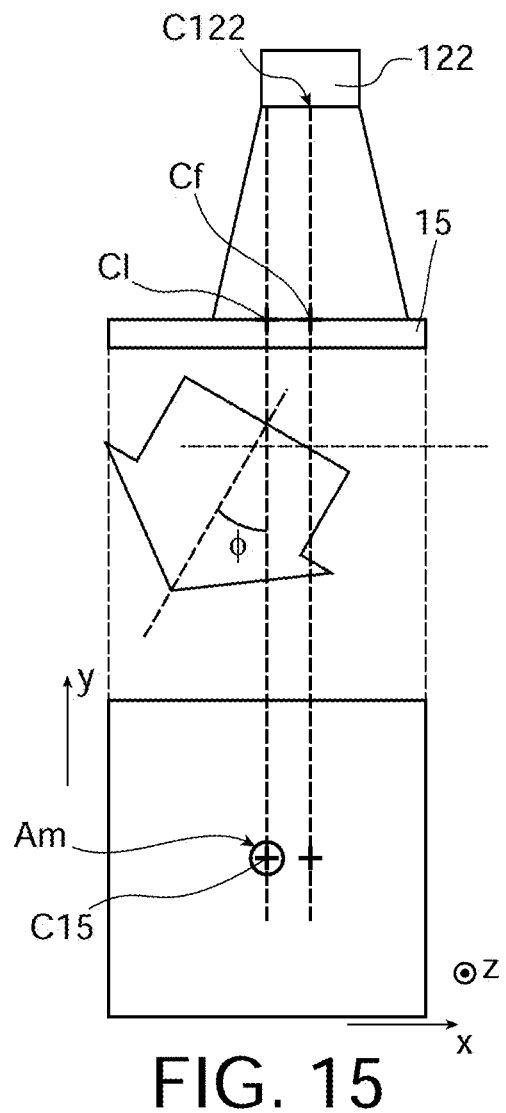
FIG. 15 illustrates the solution recommended by Adachi et al. to modify the angle of a beam in normal incidence on the lens.

In FIGS. 14a and 14b, the beam at the output of the vertical coupler is vertical (Θ2=0°), and the lens carries out or not a modification of the angle of the beam φ after its crossing. Without modification of the angle of the beam (FIG. 14a), the collimation structure has a circular symmetry around an axis of symmetry merged with the median axis Am of the lens. With modification of the angle of the beam (FIG. 14b) so that it has, at the output of the lens 15, a non-zero angle φ with the vertical, the collimation structure has a circular symmetry around an axis of symmetry Ad, perpendicular to the plane (x,y) and distant by a non-zero value from the median axis of the lens. The centre of the beam, Cf, on the plane x,y of the lens remains merged with the centre C15 of the lens. As a comparison, in FIG. 15 is represented the solution recommended by Adachi et al. to modify the angle of a beam in normal incidence and which consists in offsetting the centre Cl of the lens with respect to the centre Cf of the beam incident on the plane (x,y) of the lens. In this solution, the axis of circular symmetry of the lens is merged with its median axis Am.

The collimation structure is configured to generate a curved phase shift of an incident flat wave front from the exterior of the chip, a phase shift such that the rays are, after crossing the collimation structure, all in phase at the focal point of the collimation structure, the focal point being the vertical coupler (assimilated with a point opposite the thickness Th of the substrate 10). Vice versa, the collimation structure generates a flat wave front from a divergent beam coming from the vertical coupler. FIGS. 6a and 7a are views of the patterns along a section parallel to the plane (xz) whereas FIGS. 6b and 7b are views of the patterns along a section parallel to the plane (xy).

The diameter of the posts is calculated according to the methodology described below. The patterns are considered as cylindrical, made of silicon material of index $n_{Si}$, of thickness h, of diameter Wsi. These posts are considered to be encapsulated in $SiO_2$ of index $n_{SiO2}$.

In the example of FIG. 6a where the focal point is on the median axis Am=z of the collimation structure, the trenches being filled by $SiO_2$, this configuration is translated by:

$$\frac{2\pi}{\lambda}\tilde{n}(x,y)h + \frac{2\pi}{\lambda}n_0\sqrt{F^2+x^2+y^2} = \frac{2\pi}{\lambda}\tilde{n}(0)h + \frac{2\pi}{\lambda}n_0 F$$

Thus $$\tilde{n}(x,y) = \tilde{n}(0) - \frac{n_0\sqrt{F^2+x^2+y^2} - n_0 F}{h},$$

where ñ(x, y) represents the mean index of the lens at the position (x,y), linked to the silicon fill factor, h the thickness of the silicon patterns, F corresponds to the thickness Th of the substrate (for example 775 μm for a SOI substrate of 300 mm diameter), λ the central wavelength of the light beam and $n_0$ the index of the material composing the substrate 10.

The mean index ñ(x) is linked to the silicon fill factor $f_{Si}(x)$, by:

$$\tilde{n}(x) = \sqrt{f_{Si}(x)*n_{Si}^2 + (1-f_{Si}(x))*n_{SiO_2}^2}$$

The evolution of the silicon fill factor is deduced therefrom:

$$f_{Si}(x) = \frac{\left(\sqrt{f_{Si}(0)*n_{Si}^2+(1-f_{Si}(0))*n_{SiO_2}^2} - \frac{n_0\sqrt{F^2+x^2+y^2}-n_0 F}{h}\right)^2 - n_{SiO_2}^2}{\left(n_{Si}^2 - n_{SiO_2}^2\right)}$$

If it is considered that the collimation structure is similar to a pseudoperiodic array, of pseudoperiod P (position of the centres of the posts) and of which the variable diameter of the posts $W_{Si}(x, y)$, the patterns have a diameter defined according to a series $W_{Si}(n, p)$, verifying, for n∈[−N;N] and p∈[−N;N]:

$$W_{Si}(n,p) = 2P \cdot \sqrt{\frac{\left(\sqrt{\frac{\pi W_{Si}(0)^2 * n_{Si}^2 + (4P^2 - \pi W_{Si}(0)^2)*n_{SiO_2}^2}{4P^2}} - n_0\frac{\sqrt{F^2+(nP)^2+(pP)^2}-F}{h}\right)^2 - n_{SiO_2}^2}{\pi(n_{Si}^2 - n_{SiO_2}^2)}} \quad (1)$$

In the example of FIG. 7a, the focal point of the collimation structure is offset from the median axis z of the structure 15 by a distance X=Th×tan Θ2. The collimation structure is calculated as follows:

$$\frac{2\pi}{\lambda}\tilde{n}(x,y)h + \frac{2\pi}{\lambda}n_0\sqrt{F^2+(x-X)^2+y^2} = \frac{2\pi}{\lambda}\tilde{n}(0)h + \frac{2\pi}{\lambda}n_0\sqrt{F^2+X^2}$$

Thus, $\tilde{n}(x) = \tilde{n}(0) - n_0\frac{\sqrt{F^2+(x-X)^2+y^2} - \sqrt{F^2+X^2}}{h}$.

Knowing that:

$$\tilde{n}(x) = \sqrt{f_{Si}(x)*n_{Si}^2 + (1-f_{Si}(x))*n_{SiO_2}^2}$$

It may be deduced therefrom that:

$$f_{Si}(x) = \frac{\left(\sqrt{f_{Si}(0)*n_{Si}^2+(1-f_{Si}(0))*n_{SiO_2}^2} - n_0\frac{\sqrt{F^2+(x-X)^2+y^2}-\sqrt{F^2+X^2}}{h}\right)^2 - n_{SiO_2}^2}{(n_{Si}^2-n_{SiO_2}^2)}$$

If it is considered that the collimation structure is similar to a pseudoperiodic array, of pseudoperiod P (position of the centres of the posts) and of which the variable diameter of the posts $W_{Si}(x, y)$, the patterns have a diameter defined according to a series $W_{Si}(n, p)$, verifying, for $n \in [-N;N]$ and $p \in [-N;N]$:

$$W_{Si}(n, p) = \qquad (2)$$

$$2P \cdot \sqrt{\frac{\left(\sqrt{\frac{\pi W_{Si}(0)^2*n_{Si}^2+(4P^2-\pi W_{Si}(0)^2)*n_{SiO_2}^2}{4P^2}} - n_0\frac{\sqrt{F^2+(nP-X)^2+(pP)^2}-\sqrt{F^2+X^2}}{h}\right)^2 - n_{SiO_2}^2}{\pi(n_{Si}^2-n_{SiO_2}^2)}}$$

For a collimation structure without uprighting, it is the central pattern of the collimation structure that has the greatest width, thus it is possible to fix:

$$W_{Si}(0) = P - cd\_min \qquad \text{Equation (NR)},$$

with cd_min the minimum width of a trench technically realisable by etching. Such a collimation structure has a circular symmetry around the median axis of the lens Am, defined as the axis perpendicular to (x,y) and which passes through the mid-point C15 of the collimation structure. Thus the posts equidistant from the median axis have an identical diameter (cf. FIG. 6b). In the plane x, y, the lens has a square surface of sides D=Di (or a circular surface of diameter D=Di), with Di=Th/[cos(Θ2). nsub10]×2λ/(π. wo), where nsub10 is the index of the substrate 10.

In the case of a vertical coupler 122 of surface grating coupler type such that Θ2≠0 and a collimation structure making it possible to ensure the uprighting of the beam (that is to say, at the output of 15, an angle of the beam φ=0), it is possible to find the position of the largest pattern by deriving the equation (2) with respect to n: it is the pattern of abscissa X that is the largest (the one directly in line with the focal point C122). This collimation structure then has a circular symmetry around the axis Ad, perpendicular to the plane (x,y) and passing through the point Opv, Opv being the orthogonal projection of C122 on the plane (x,y) of the collimation structure 15 (FIG. 7b). In the plane x,y, Opv is thus translated, with respect to C15, by X~Th*tan Θ2 parallel to the axis X.

For this collimation structure of circular symmetry around an axis Ad offset with respect to the median axis Am, the equations may be rewritten, not as a function of $W_{Si}(0)$, but as a function of $W_{Si}(X)$:

$$\frac{2\pi}{\lambda}\tilde{n}(x, y)h + \frac{2\pi}{\lambda}n_0\sqrt{F^2+(x-X)^2+y^2} = \frac{2\pi}{\lambda}\tilde{n}(X, 0)h + \frac{2\pi}{\lambda}n_0 F$$

Thus: $\tilde{n}(x, y) = \tilde{n}(X, 0) + \frac{n_0}{h}\left[F - \sqrt{F^2+(x-X)^2+y^2}\right]$ $$f_{Si}(x) = \frac{\left[\sqrt{f_{Si}(X)*n_{Si}^2+(1-f_{Si}(X))*n_{SiO_2}^2} + \frac{n_0}{h}\left[F-\sqrt{F^2+(x-X)^2+y^2}\right]\right]^2 - n_{SiO_2}^2}{(n_{Si}^2-n_{SiO_2}^2)}$$

Thus:

$$W_{Si}(n, p) =$$

$$2P \cdot \sqrt{\frac{\left[\sqrt{\frac{\pi W_{Si}(X)^2*n_{Si}^2+(4P^2-\pi W_{Si}(X)^2)*n_{SiO_2}^2}{4P^2}} - n_0\frac{\left[\sqrt{F^2+(nP-X)^2+(pP)^2}-F\right]}{h}\right]^2 - n_{SiO_2}^2}{\pi(n_{Si}^2-n_{SiO_2}^2)}}$$

When X<D/2 with D the width of the collimation structure along the axis x, the biggest pattern is that of the abscissa X: $W_{Si-max} = W_{Si}(X) = P - cd\_min$.

It may be deduced therefrom that:

$$W_{Si}(n, p) = \qquad (3)$$

$$2P \cdot \sqrt{\frac{\left[\sqrt{\frac{\pi(P-cd\_min)^2*n_{Si}^2+(4P^2-\pi(P-cd\_min)^2)*n_{SiO_2}^2}{4P^2}} - n_0\frac{\left[\sqrt{F^2+(nP-X)^2+(pP)^2}-F\right]}{h}\right]^2 - n_{SiO_2}^2}{\pi(n_{Si}^2-n_{SiO_2}^2)}}$$

It is also possible to determine the minimum diameter $W_{Si-min}$ of a pattern, which is the diameter of the pattern the furthest away from the abscissa X. This gives:

$$W_{Si-min} =$$

$$2P \cdot \sqrt{\frac{\left[\sqrt{\frac{\pi(P-cd\_min)^2*n_{Si}^2+(4P^2-\pi(P-cd\_min)^2)*n_{SiO_2}^2}{4P^2}} - n_0\frac{\left[\sqrt{F^2+(NP+X)^2+(NP)^2}-F\right]}{h}\right]^2 - n_{SiO_2}^2}{\pi(n_{Si}^2-n_{SiO_2}^2)}} = cd\_min$$

This latter equation makes it possible to determine the minimum etching thickness h making it possible to design a technically realisable collimation structure, that is to say not exceeding cd_min and P−cd_min in diameter of patterns, for a given width of lens D along the axis x:

$$h = n_0 \frac{2P\left[\sqrt{F^2 + (NP+X)^2 + (NP)^2} - F\right]}{\sqrt{\pi(P-\mathrm{cd\_min})^2 * n_{Si}^2 + (4P^2 - \pi(P-\mathrm{cd\_min})^2) * n_{SiO_2}^2} - \sqrt{\pi \mathrm{cd}_{min}^2 * (n_{Si}^2 - n_{SiO_2}^2) + 4P^2 n_{SiO_2}^2}} \quad (3\mathrm{bis})$$

Conversely, if $X>D/2$, then the largest pattern is that which is the closest to the abscissa X. Taking the case $X>0$ where the largest pattern is that of index N (for $X<0$, it suffices to turn over the collimation structure). The equations with respect to this pattern of index N are re-written:

$$\frac{2\pi}{\lambda}\tilde{n}(x,y)h + \frac{2\pi}{\lambda}n_0\sqrt{F^2 + (x-X)^2 + y^2} = \frac{2\pi}{\lambda}\tilde{n}(N,P)h + \frac{2\pi}{\lambda}n_0\sqrt{F^2 + (NP-X)^2}$$

This gives in the end:

$$\tilde{n}(x,y) = \tilde{n}(N,P) - n_0 \frac{\sqrt{F^2 + (x-X)^2 + y^2} - \sqrt{F^2 + (NP-X)^2}}{h}$$

$$W_{Si(n,p)} = 2P\sqrt{\frac{\left[\sqrt{\frac{\pi W_{Si}(NP)^2 * n_{Si}^2 + (4P^2 - \pi W_{Si}(NP)^2) * n_{SiO_2}^2}{4P^2}} - n_0\frac{\left[\sqrt{F^2 + (nP-X)^2 + (pP)^2} - \sqrt{F^2 + (NP-X)^2}\right]}{h}\right]^2 - n_{SiO_2}^2}{\pi(n_{Si}^2 - n_{SiO_2}^2)}}$$

By imposing the greatest dimension on the pattern of index N, this gives:

$$W_{Si}(n,p) = 2P \cdot \sqrt{\frac{\left[\sqrt{\frac{\pi(P-\mathrm{cd\_min})^2 * n_{Si}^2 + (4P^2 - \pi(P-\mathrm{cd\_min})^2) * n_{SiO_2}^2}{4P^2}} - n_0\frac{\left[\sqrt{F^2 + (nP-X)^2 + (pP)^2} - \sqrt{F^2 + (NP-X)^2}\right]}{h}\right]^2 - n_{SiO_2}^2}{\pi(n_{Si}^2 - n_{SiO_2}^2)}} \quad (4)$$

The post of smallest dimension is then of index $(-N, \pm N)$:

$$W_{Si-min} = 2P \cdot \sqrt{\frac{\left[\sqrt{\frac{\pi(P-\mathrm{cd\_min})^2 * n_{Si}^2 + (4P^2 - \pi(P-\mathrm{cd\_min})^2) * n_{SiO_2}^2}{4P^2}} - n_0\frac{\left[\sqrt{F^2 + (NP-X)^2 + (NP)^2} - \sqrt{F^2 + (NP-X)^2}\right]}{h}\right]^2 - n_{SiO_2}^2}{\pi(n_{Si}^2 - n_{SiO_2}^2)}} = \mathrm{cd\_min}$$

Which gives the value of h in this case:

$$h = n_0 \frac{2P\left[\sqrt{F^2 + (NP+X)^2 + (NP)^2} - \sqrt{F^2 + (NP-X)^2}\right]}{\sqrt{\pi(P-\mathrm{cd\_min})^2 * n_{Si}^2 + (4P^2 - \pi(P-\mathrm{cd\_min})^2) * n_{SiO_2}^2} - \sqrt{\pi \mathrm{cd}_{min}^2 * (n_{Si}^2 - n_{SiO_2}^2) + 4P^2 n_{SiO_2}^2}} \quad (4\mathrm{bis})$$

The procedure for designing the collimation structure may be the following:

1) Given P and cd_min, the necessary thickness of the collimation structure is determined according to the equations (3bis) or (4bis), depending on whether $X<D/2$ or $X>D/2$.
2) With the thickness h found previously, the exact profile of the collimation structure according to the equations (3) or (4) is then deduced therefrom, depending on whether $X<D/2$ or $X>D/2$.

From the calculation developed previously, the calculation of parallelepiped (and no longer cylindrical) posts is obvious.

In an alternative embodiment, the collimation structure does not form the equivalent of a simple lens but the equivalent of a Fresnel lens. According to this approach, a lower thickness h is imposed, and higher gradients of index are allowed to compensate this low thickness, these gradients being repeated by modulo-$2\pi$ phases to cover the entire width of the collimation structure. According to this approach:

$$\frac{2\pi}{\lambda}\tilde{n}(x,y)h + \frac{2\pi}{\lambda}n_0\sqrt{F^2 + (x-X)^2 + y^2} = \frac{2\pi}{\lambda}\tilde{n}(X)h + \frac{2\pi}{\lambda}n_0 F[2\pi] \quad (5)$$

Thus $\tilde{n}(x,y) = \tilde{n}(X) - \frac{n_0}{h}\left[\sqrt{F^2 + (x-X)^2 + y^2} - F\right] + m\frac{\lambda}{h}, m \in Z^+$ Thus $$f_{Si}(x,y) = \frac{\left[\sqrt{f_{Si}(X) * n_{Si}^2 + (1 - f_{Si}(X)) * n_{SiO_2}^2} - \frac{n_0}{h}\left[\sqrt{F^2 + (x-X)^2 + y^2} - F\right] + m\frac{\lambda}{h}\right]^2 - n_{SiO_2}^2}{(n_{Si}^2 - n_{SiO_2}^2)}$$

Thus:

$$W_{Si}(n,p) = 2P \cdot \sqrt{\frac{\left[\sqrt{\frac{\pi(P-\mathrm{cd\_min})^2 * n_{Si}^2 + (4P^2 - \pi(P-\mathrm{cd\_min})^2) * n_{SiO_2}^2}{4P^2}} - n_0\frac{\left[\sqrt{F^2 + (nP-X)^2 + (pP)^2} - F\right]}{h} + m\frac{\lambda}{h}\right]^2 - n_{SiO_2}^2}{\pi(n_{Si}^2 - n_{SiO_2}^2)}}$$

The term m makes it possible to add an increment to the width to avoid it dropping below cd_min. However, this increment must not make the width pass beyond P−cd_min to have the modulo-$2\pi$ phase, or below cd_min respectively. This imposes constraints on the minimum thickness of the Fresnel lens hmin, so that it can be technically realisable. Let it be assumed that one of the patterns has a width of cd_min (lower limit). This pattern has an index (n', p') that verifies:

$$\frac{cd\_min^2 \pi (n_{Si}^2 - n_{SiO_2}^2) + 4P^2 \cdot n_{SiO_2}^2}{4P^2} =$$

$$\left[\sqrt{\frac{\pi(P - cd\_min)^2 * n_{Si}^2 + (4P^2 - \pi(P - cd\_min)^2) * n_{SiO_2}^2}{4P^2}} - n_0 \frac{\left[\sqrt{F^2 + (n'P - X)^2 + (p'P)^2} - F\right]}{h}\right]^2$$

It is necessary that an addition of λ/h in the square of the right term generates a width less than P–cd_min in the equation (5), i.e.:

$$P - cd_{min} \geq 2P \cdot \sqrt{\frac{\frac{cd\_min^2 \pi (n_{Si}^2 - n_{SiO_2}^2) + 4P^2 \cdot n_{SiO_2}^2}{4P^2} + \frac{\lambda^2}{h_{min}^2} + 2\frac{\lambda}{h_{min}}\sqrt{\frac{cd\_min^2 \pi (n_{Si}^2 - n_{SiO_2}^2) + 4P^2 \cdot n_{SiO_2}^2}{4P^2}}}{\pi(n_{Si}^2 - n_{SiO_2}^2)}}$$

It is deduced therefrom that there is a constraint between the wavelength and the thickness, for a given technology (P, cdmin), in order that the Fresnel lens can be realised.

$$\left[P\pi(P - 2cd_{min})(n_{Si}^2 - n_{SiO_2}^2) - 4P^2 n_{SiO_2}^2\right] \cdot h^2 - \left[8P^2\lambda\sqrt{\frac{cd\_min^2 \pi (n_{Si}^2 - n_{SiO_2}^2) + 4P^2 \cdot n_{SiO_2}^2}{4P^2}}\right]h - 4P^2\lambda^2 \geq 0$$

hmin thus corresponds to the 2$^{nd}$ root of the afferent equation of 2$^{nd}$ degree, i.e.:

$$h_{min} = 2\lambda \frac{\sqrt{cd\_min^2 \pi (n_{Si}^2 - n_{SiO_2}^2) + 4P^2 \cdot n_{SiO_2}^2} + \sqrt{\pi(n_{Si}^2 - n_{SiO_2}^2)}}{\pi(P - 2cd_{min})(n_{Si}^2 - n_{SiO_2}^2) - 4Pn_{SiO_2}^2} (P - cd_{min}) \quad (6)$$

The period P cannot exceed λ/2 so that the structuring behaves like a medium of mean index. By imposing this constraint, it is possible to simplify the expression (6), and end up with:

$$h_{min} = 2\lambda \frac{2\sqrt{cd\_min^2 \pi (n_{Si}^2 - n_{SiO_2}^2) + \lambda^2 \cdot n_{SiO_2}^2} + \sqrt{\pi(n_{Si}^2 - n_{SiO_2}^2)}}{\pi(\lambda - 4cd_{min})(n_{Si}^2 - n_{SiO_2}^2) - 4\lambda n_{SiO_2}^2} (\lambda - 2cd_{min})$$

Figure 8:
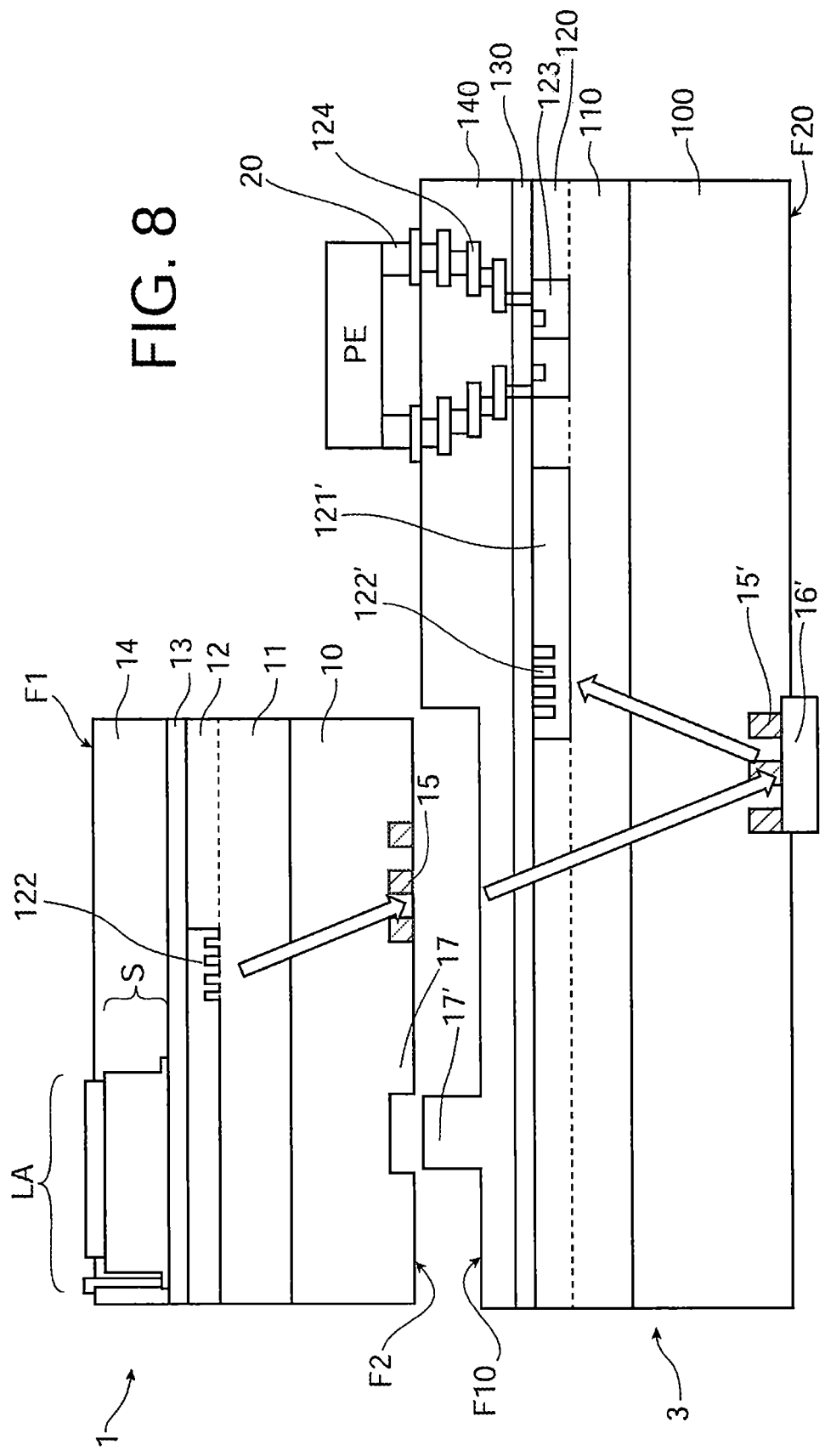
FIG. 8 illustrates the coupling of a photonic chip conforming to FIG. 2 to another photonic chip conforming to FIG. 3.

In FIG. 8 is represented the coupling of a photonic chip 1 conforming to FIG. 2 with another photonic chip 3 conforming to FIG. 3. In this example, the vertical couplers of the chips 1, 3 are surface grating couplers 122, 122'. The photonic chip 3 is formed on a SOI substrate and includes a light guiding layer 120 covered with an encapsulation layer 140 (here comprising interconnection metal levels) and separated from a support substrate 100 by a buried oxide layer made of $SiO_2$ 110. It has a front face F10 on the encapsulation layer side 140 and a rear face F20 on the substrate side 100. A reflective lens 15', 16' is integrated at the level of the rear face F20. This reflective lens 15', 16' has the same characteristics as the lens 15 integrated at the level of the chip 1 conforming to the invention, apart from the fact that the height of the patterns is divided by 2. The light guiding layer 120 includes a waveguide 121' and a surface grating coupler 122' which is configured to emit/receive light to/from the waveguide 121', but in the direction of the face of the chip opposite the face to which are oriented the teeth of the coupler (such an coupler may for example be designed in a silicon layer of 160 nm thickness in which the etching teeth of the coupler are etched over a depth of 90 nm, or instead a silicon layer of 300 nm thickness in which the etching teeth are etched over the entire thickness).

An example of dimensioning of the collimation structure of the chip 1 of FIG. 8 is the following. A surface grating coupler is used by way of vertical coupler (Do=9.2 μm), produced using silicon photonics technology, in a SOI substrate. A silicon substrate of thickness Th=775 μm and of index nSi is used. With an output angle of the surface grating coupler Θ1 in $SiO_2$ equal to 8°, Θ2 in silicon is equal to 3.3° ($n_{Si}$×sin (Θ2)=$n_{SiO2}$×sin (Θ1) with $n_{Si}$=3.5 and $n_{SiO2}$=1.45). The beam incident on the lens 15 thus has a mode size Th×2λ/(π. wo×cos Θ2. nSi)=Di~40 μm. The centre of the collimation structure is offset from the centre of the vertical coupler by X=Th×tan (Θ2)~44.8 μm. The smallest possible thickness of the cylindrical patterns in a two-dimensional array with constant mesh size P, is sought. The minimum diameter of a pattern is set at 80 nm, and a pseudo-period of the etched structures P=500 nm is considered.

With the preceding equations, the minimum thickness of the patterns of the collimation structure is calculated in the case where it is of the simple lens type or of the Fresnel lens type. In the digital application retained, the minimum thickness is around 1.5 μm for the case of a Fresnel lens and several μm for the case of a simple lens. Then the diameters of the patterns to etch to form the collimation structure are calculated by considering $W_{Si-min}$=0.08 μm. In the case of the chip 3 where the collimation structure 15 is coupled to a mirror 16, the thickness h of the posts is divided by 2.

Still with reference to FIG. 8, and without this being exclusive to this exemplary embodiment, the chip according to the invention may have on the rear face F2 alignment patterns 17 with the other chip 3, and notably alignment patterns 17 intended to cooperate with complementary patterns 17' on the front face F10 of the other chip for example to ensure a mechanical alignment of the lenses 15 and 15', 16' on the rear faces F2, F20 of the two chips 1, 3. With the digital application described previously, Di=40 μm for a surface grating coupler of the prior art 122, 122' and a lens 15, 15' produced in a substrate of 775 μm thickness. The alignment between the two chips has to be made to around +/8 μm (compared with +/−2 μm when two surface couplers of the prior art are aligned).

In this FIG. 8 is furthermore represented an electronic chip PE made integral on the front face F10 of the photonic chip 3, for example by means of copper micro-pillars 20. The electronic chip PE, intended to control or to read the active photonic components of the chip 3, is thus connected, by means of copper micro-pillars 20 and metal levels 124 traversing the layer 140, to the active photonic components (including for example a modulator 123) formed in the light guiding layer 120.

In FIG. 9 is represented an alternative embodiment of a photonic chip conforming to FIG. 3. The substrate 10 is made of semiconductor material, typically silicon, and separated from the layer 11 by an antireflective layer 21. The substrate 10 is covered on the rear face side with a metal layer 16 making it possible to make the lens 15 reflective. In this FIG. 9 is furthermore represented an electronic chip PE made integral on the rear face F2 of the photonic chip, for example by means of copper micro-pillars 20. This chip PE, intended to control or to read the active photonic components, is connected, notably by means of electrical interconnection vias 125 traversing the substrate 10, to these active photonic components (including for example a modulator 123) formed in the light guiding layer 12. As represented in FIG. 10c, the electronic chip PE may alternatively be arranged on the front face F1 of the photonic chip. In this case, the electrical interconnection layers 124 between the active components 123 and the electronic chip PE are embedded in the layer 14 (and optionally the layer or layers 13 and 12) of the photonic chip.

Figure 10A:
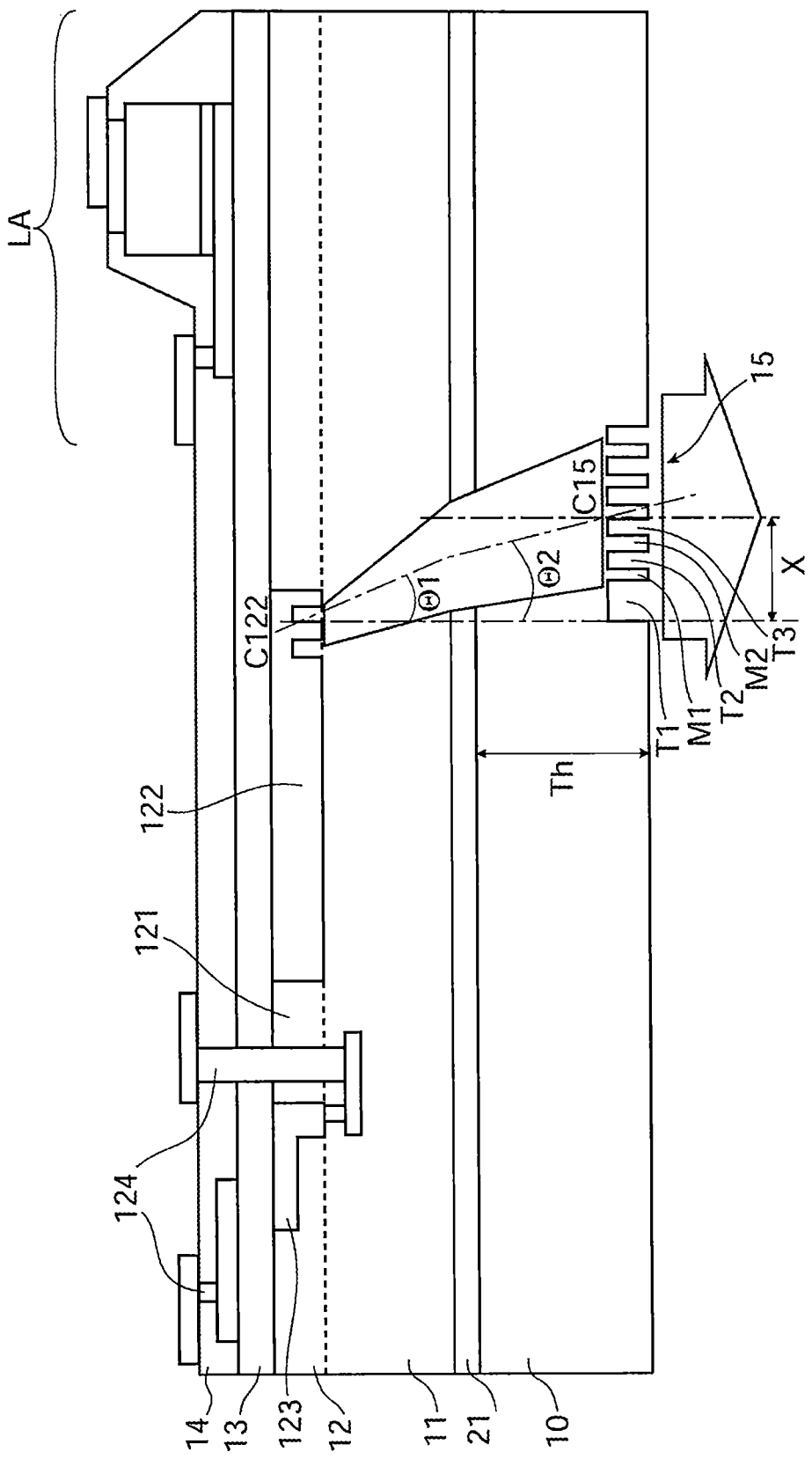
FIGS. 10a and 10b illustrate two alternative embodiments of a photonic chip conforming to FIG. 2.
Figure 10B:
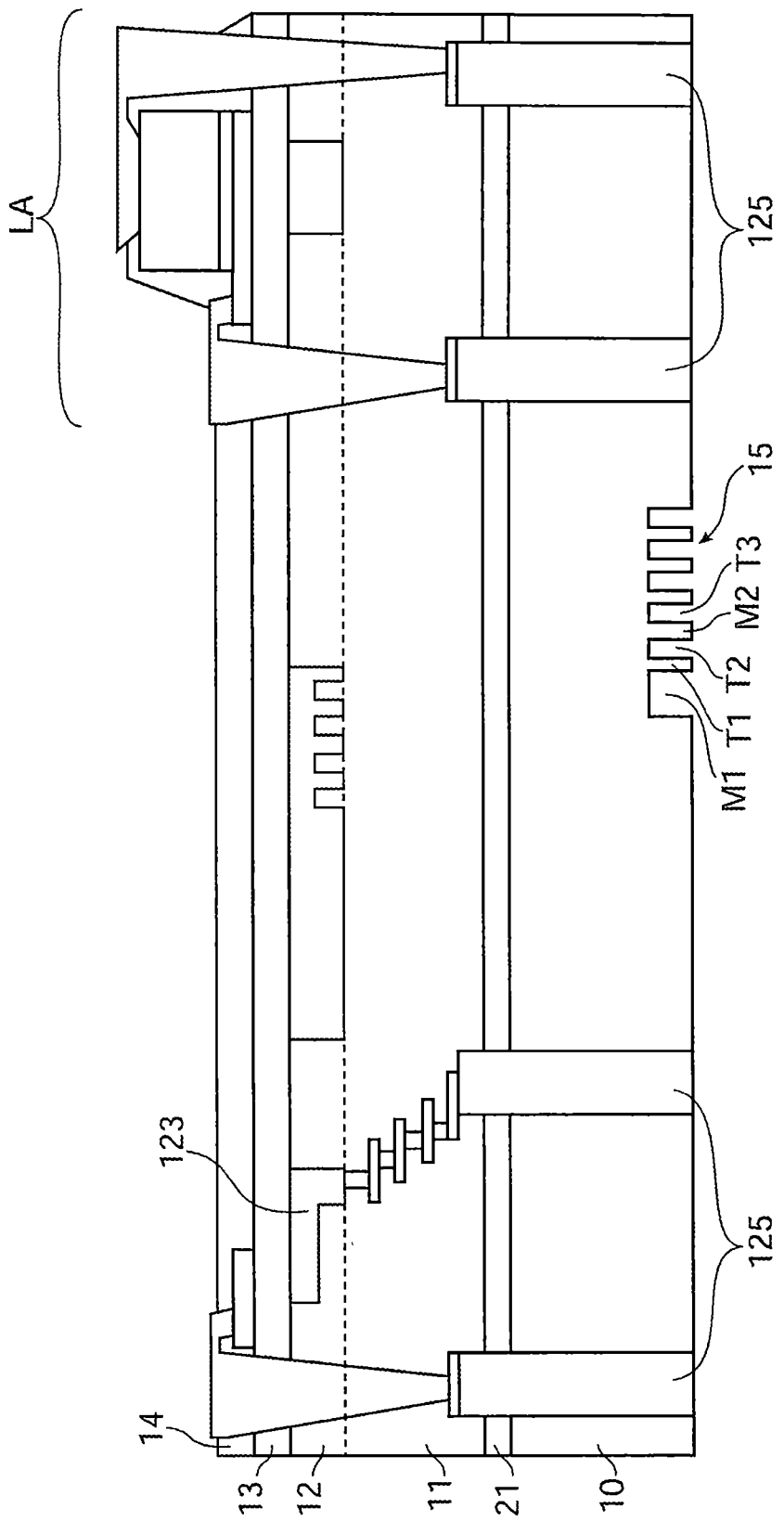
Figure 10C:
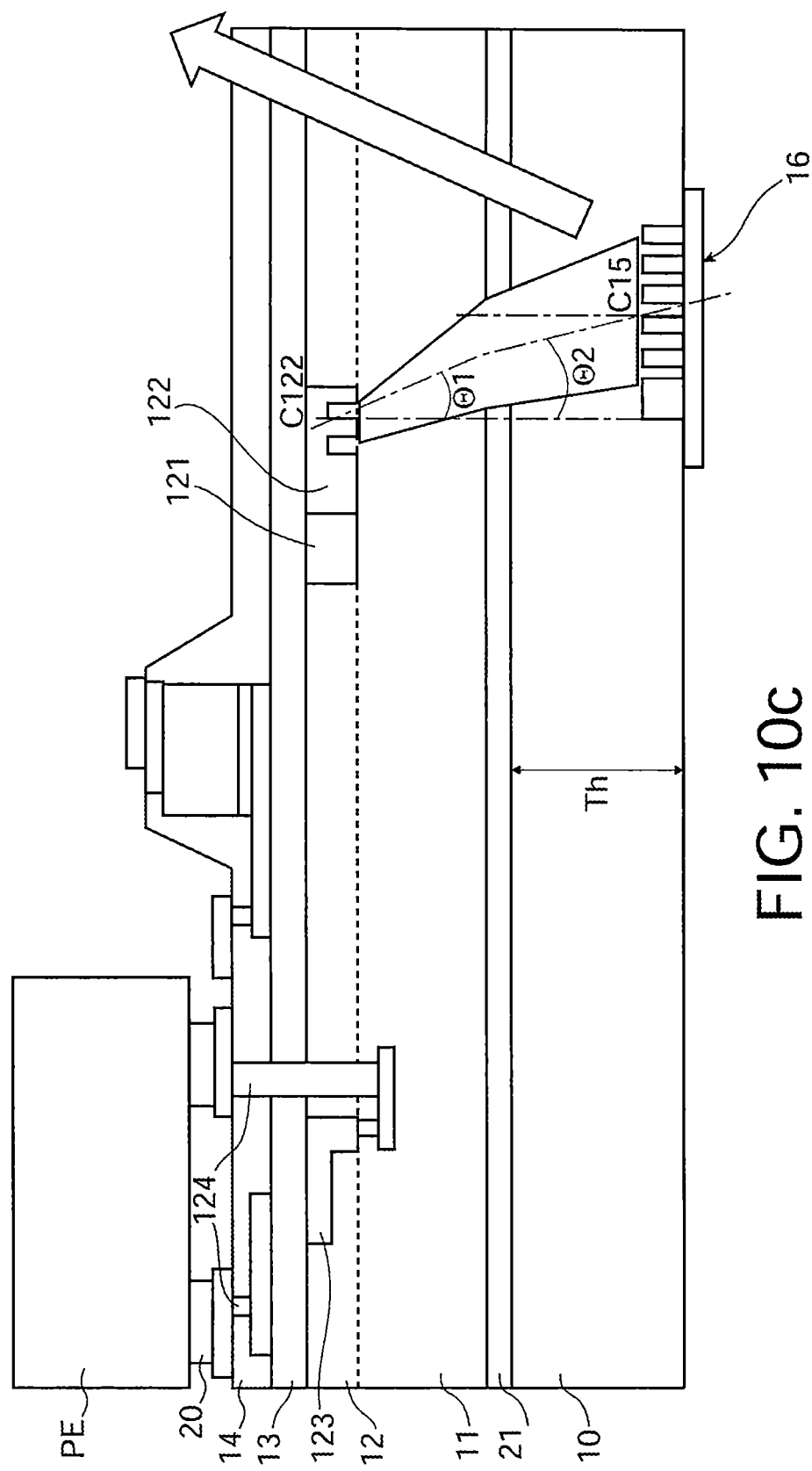
FIG. 10c illustrates an alternative embodiment of a photonic chip conforming to FIG. 3.

In FIGS. 10a and 10b are represented different embodiments of a photonic chip conforming to FIG. 2 including an antireflective layer 21 arranged between the layer 11 and the substrate 10.

In the embodiment represented in FIG. 10a, the lens 15 is configured to extract the light traversing it from the vertical coupler 122 along the normal to the rear face F2 of the chip. It has been seen previously that the vertical coupler 122 makes it possible to pass from a propagation guided in the plane of the chip to a quasi-vertical propagation forming an angle with the normal to the rear face of the chip (during its crossing of the substrate 10, the beam coming from the surface grating coupler actually forming a non-zero angle $\Theta 2$ with the vertical, for example 4°. It is in fact not possible to have a zero angle without increasing the coupling losses of the surface grating coupler. With the digital lens, it is possible to upright the beam so that it is perpendicular to the plane of the chip at the output of the lens ($\phi=0°$). The beam at the output of the rear face of the photonic chip is thereby uprighted and perpendicular to the front and rear faces of the chip.

The fact of extracting, thanks to the invention, a collimated beam of expanded size makes it possible to increase the alignment tolerance of the chip with an optical-mechanical interface part laid on one face of the chip. But the reception angular tolerance is reduced. By uprighting the beam so that it has an angle of 90° with the rear face of the chip, coupling with the interface part is facilitated. Thus the part may be laid on the flat surface of the chip, in a manner rigorously perpendicular thereto. The problem of angular sensitivity of alignment is thereby completely resolved, since the optical-mechanical part, in contact with the rear face F2 of the chip, is rigorously perpendicular to the chip, without possible angular gap.

In FIG. 10a are represented electrodes for electrical contacts with the laser LA and a modulator 123 on the front face F1 of the photonic chip, with interconnections 124 embedded in the layers 14, 13 and 12. The chip of FIG. 10a could also use a lens 15 with a mirror 16, in such a way that the beam is extracted from the photonic chip through its front face F1 (cf. FIG. 10c). In FIG. 10b, these contacts are both realised on the rear face through electrical interconnection vias 125. This configuration makes it possible to place a heat sink on the front face. This configuration also makes it possible to have available electrical and optical interconnections on the rear face of the chip, these interconnections being able to be connected to a specialised integrated circuit through a substrate arranged on the side of the rear face of the chip.

A possible dimensioning of the lens 15 and of the vertical coupler 122 of FIG. 10a is as follows. It is proposed to use for the vertical coupler 122 a surface grating coupler designed to have a mode size Do/2=wo=1.8 µm which, as demonstrated previously, makes it possible to expand its spectral band compared to a known array of mode size wo=4.6 µm (spectral band expanded to 60 nm compared to 30 nm). Such a grating coupler gives rise to a highly divergent beam, which would not make it possible to couple efficiently the light in a single-mode fibre. The invention, through the use of the digital lens, makes it possible to collimate the beam at the output of the lens, after crossing the substrate 10. With a thickness of substrate Th=775 µm, it is possible to obtain a collimated beam with a mode size expanded to around Di=103 µm. Opposite the system constituted by the coupler 122 and the lens 15, an 'expanded beam' system (as described previously) makes it possible to couple efficiently the light in the fibre.

The system integrated in the chip {surface grating coupler with reduced mode size, highly divergent, and digital lens on the rear face} thus makes it possible to provide a beam with mode size expanded by a factor 10 compared to the prior art, collimated, uprighted and with expanded spectral band. This system thus bypasses the drawbacks of the prior art linked to surface grating couplers (non-zero angle with the vertical, low alignment tolerance with a fibre, reduced spectral band).

In an alternative embodiment of the collimation structure associated with FIG. 10a (Th=775 µm, Di=103 µm), the digital lens does not form the equivalent of a simple lens but the equivalent of a Fresnel lens. According to this approach, a smaller thickness of the trenches is imposed, and larger index gradients are allowed to compensate for this low thickness, these gradients repeating by modulo-$2\pi$ phases to cover the entire width of the collimation structure. In this context, the hypothesis will be taken of cylindrical silicon patterns repeated at a period P=0.5 µm. The patterns have a minimum diameter of cd min=0.12 µm and maximum of P−cd min=0.5−0.12 µm=0.380 µm. The minimum thickness to etch is calculated at around 1.3 µm, when the patterns are encapsulated in air. FIG. 12a gives the diameter Dp of each of the patterns as a function of their position X/P, Y/P in the array of patterns forming a lens that does not upright the beam. The centre C15 of the lens is offset by around tan ($\Theta 2$)×Th=54.4 µm with respect to the orthogonal projection of the centre C122 of the surface grating coupler 122 on the plane x,y of the lens. The lens 15 has an axis of circular symmetry merged with its median axis Am. The centre of the beam on the plane of the lens x,y is merged with the centre of the lens C15. This lens of FIG. 12a, of which the centre of circular symmetry coincides with its median axis, does not ensure the uprighting of the beam at its output. FIG. 12b relates to a lens produced according to the same manufacturing constraints as the lens of FIG. 12a (cd min=0.12 µm, P−cd min max=0.5−0.12 µm=0.380 µm, thickness of the patterns 1.3 µm), and of same size Di, but ensuring the uprighting of the beam ($\phi=0°$. FIG. 12b thus gives the diameter Dp of each of the patterns as a function of its position X/P, Y/P in an array of patterns forming a lens that uprights the beam. The centre C15 of the lens is offset by X=54.4 µm with respect to the orthogonal projection, Opv, of the centre C122 of the surface grating coupler on the plane x,y of the lens. The lens 15 has an axis of circular symmetry offset from its median axis. The axis of circular symmetry is perpendicular to the plane x,y and passes through Opv. The centre of the beam on the plane of the lens x,y is merged with the centre of the lens C15.

A possible dimensioning of the lens 15 and the surface grating coupler 122 of FIG. 10b is the following. The surface grating coupler 122 is designed to have a mode size wo=0.9 µm in order to expand its spectral band compared to a known coupler of mode size wo=4.6 µm (spectral band expanded to more than 80 nm compared to 30 nm). Such a grating coupler gives rise to a very divergent beam. The invention, by the use of the lens, makes it possible to collimate the beam at the output of the chip, after crossing the substrate 10. With a thickness of substrate Th=200 µm, compatible with the manufacture of electrical interconnection vias 125, it is possible to obtain a collimated beam having a mode size expanded to around 53 µm.

At the output of the grating coupler the divergent beam also forms a non-zero angle $\Theta 2$ with the vertical (in this example, equal to 4° in the silicon substrate 10). The centre of the lens C15 has to be offset with respect to the orthogonal projection Opv of the centre of the surface grating coupler 122 of around tan ($\Theta 2$)×Th=14 µm. With the digital lens, it is possible to upright the beam so that it is perpendicular to the plane of the chip at the output of the lens.

Figure 12C:
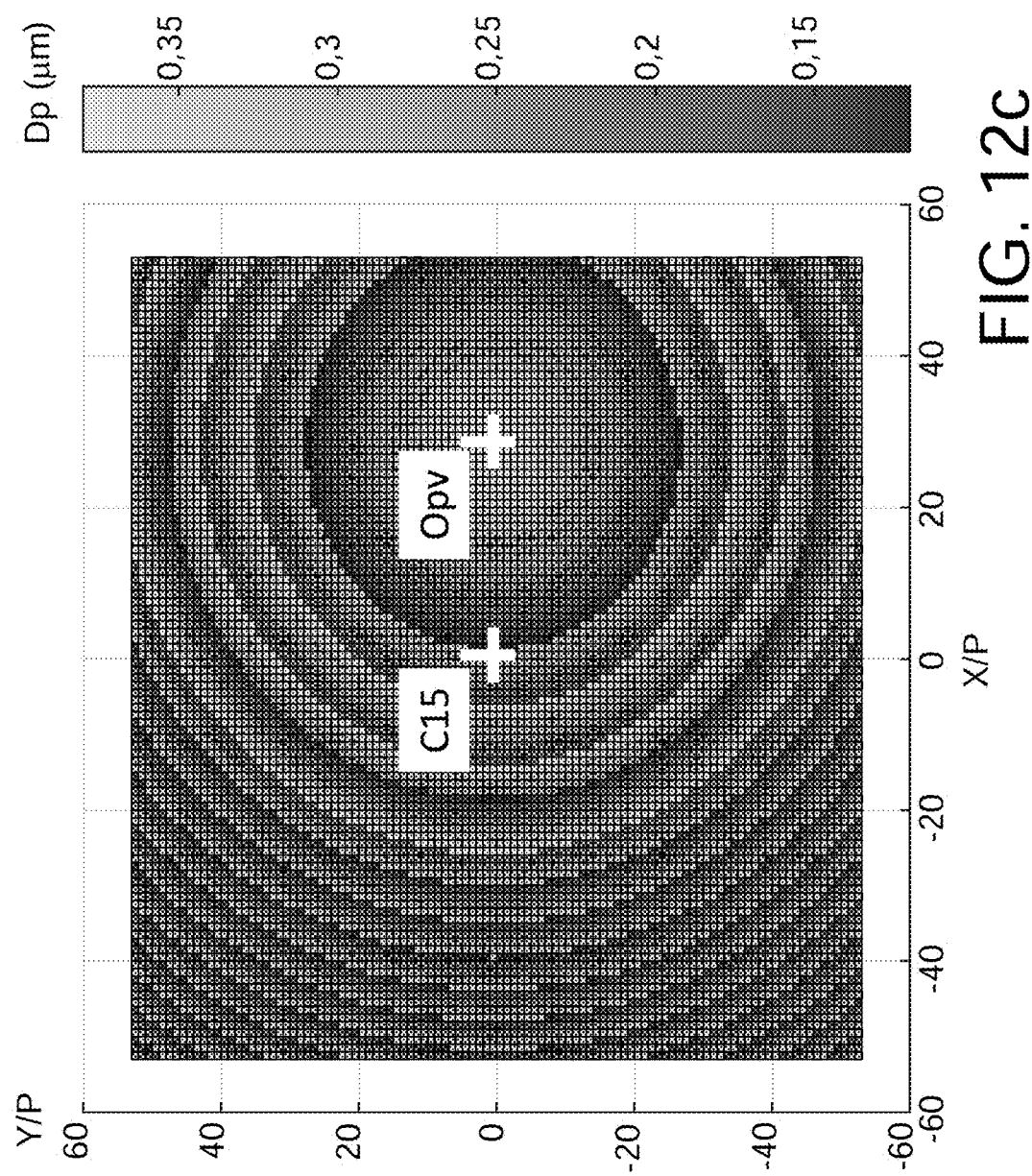

In this context, the hypothesis will still be taken of cylindrical silicon patterns repeated at a period P=0.5 µm. The patterns have a minimum diameter cd min=0.12 µm and maximum of P−cd min=0.5−0.12 µm=0.380 µm, and are encapsulated in air. The minimum thickness to etch is calculated at around 1.3 µm. FIG. 12c gives the diameter Dp of each of the patterns as a function of their position X/P, Y/P in the array of patterns forming a lens that rectifies the beam. The centre C15 of the lens is offset by around tan ($\Theta 2$)× Th=14 µm) with respect to the orthogonal projection, Opv, of the centre C122 of the surface grating coupler on the plane x,y of the lens. The lens has a circular symmetry around the axis Ad, orthogonal to the plane x,y of the lens and passing through Opv.

Figure 11C:
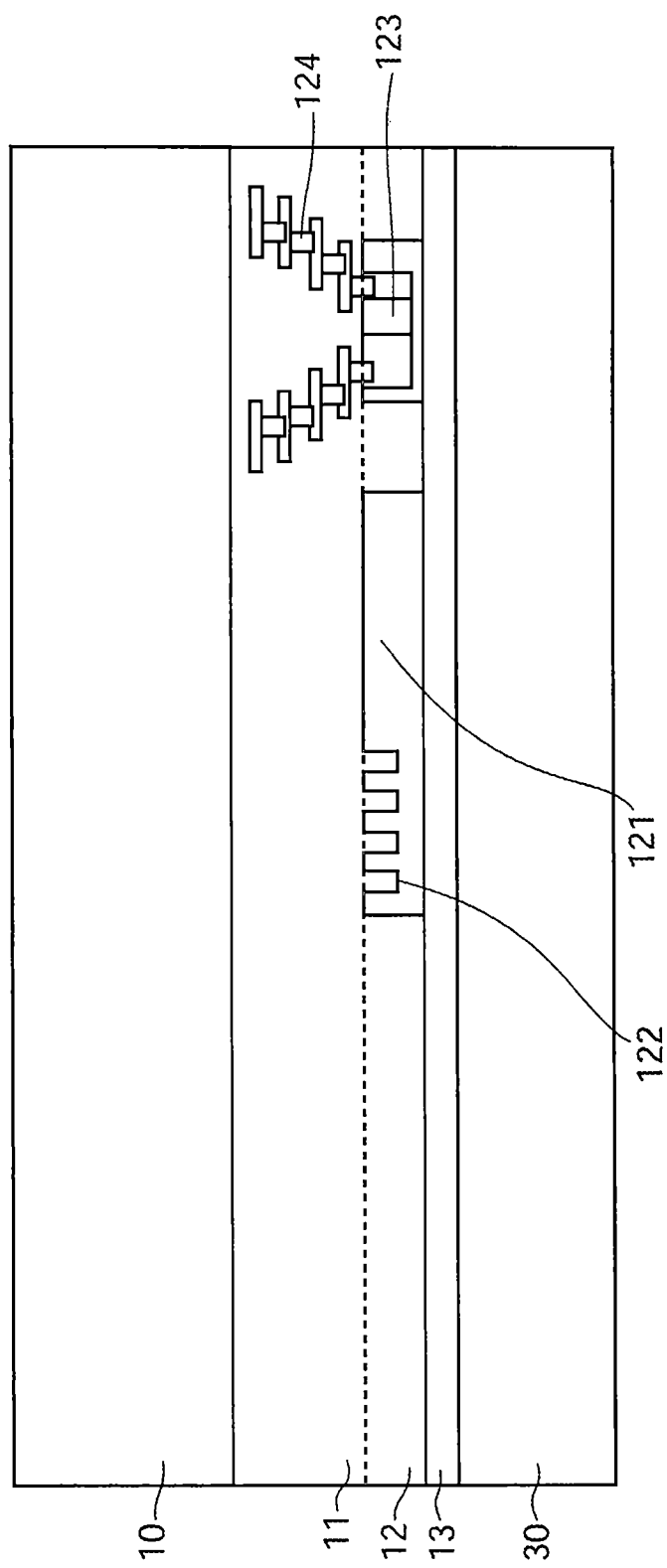

An example is described hereafter of a method for producing a photonic chip conforming to the invention and more specifically a chip according to the second embodiment represented in FIG. 2. The method starts (FIG. 11a) by the supply of a SOI substrate having a buried oxide layer 13 intercalated between a superficial silicon layer and a silicon substrate 30 and by the manufacture of the photonic components (waveguide 121, surface grating coupler 122, modulator PN 123, etc.) by localised etching, partial or total, of the superficial silicon layer and implantation in the case of the modulator. In the figure, light propagates perpendicularly to the plane of the figure for the modulator, and in the plane of the figure for the waveguide and the surface grating coupler.

The next step (FIG. 11b) is the formation of an BEOL encapsulation layer 11 made of dielectric materials, this layer including metal levels for electrical interconnection 124 with the active photonic components (here the modulator 123) of the light guiding layer 12.

A silicon substrate 10 (which may be covered with an antireflective layer, which after bonding is interposed between the substrate and the encapsulation layer 11), is transferred and next bonded (FIG. 11c) on the encapsulation layer 11. This step does not require a precise alignment during bonding (since the collimation structures have not yet been produced). A thinning of the substrate 10 may be carried out if necessary to reach a thickness typically comprised between 50 µm and 775 µm.

Figure 11D:
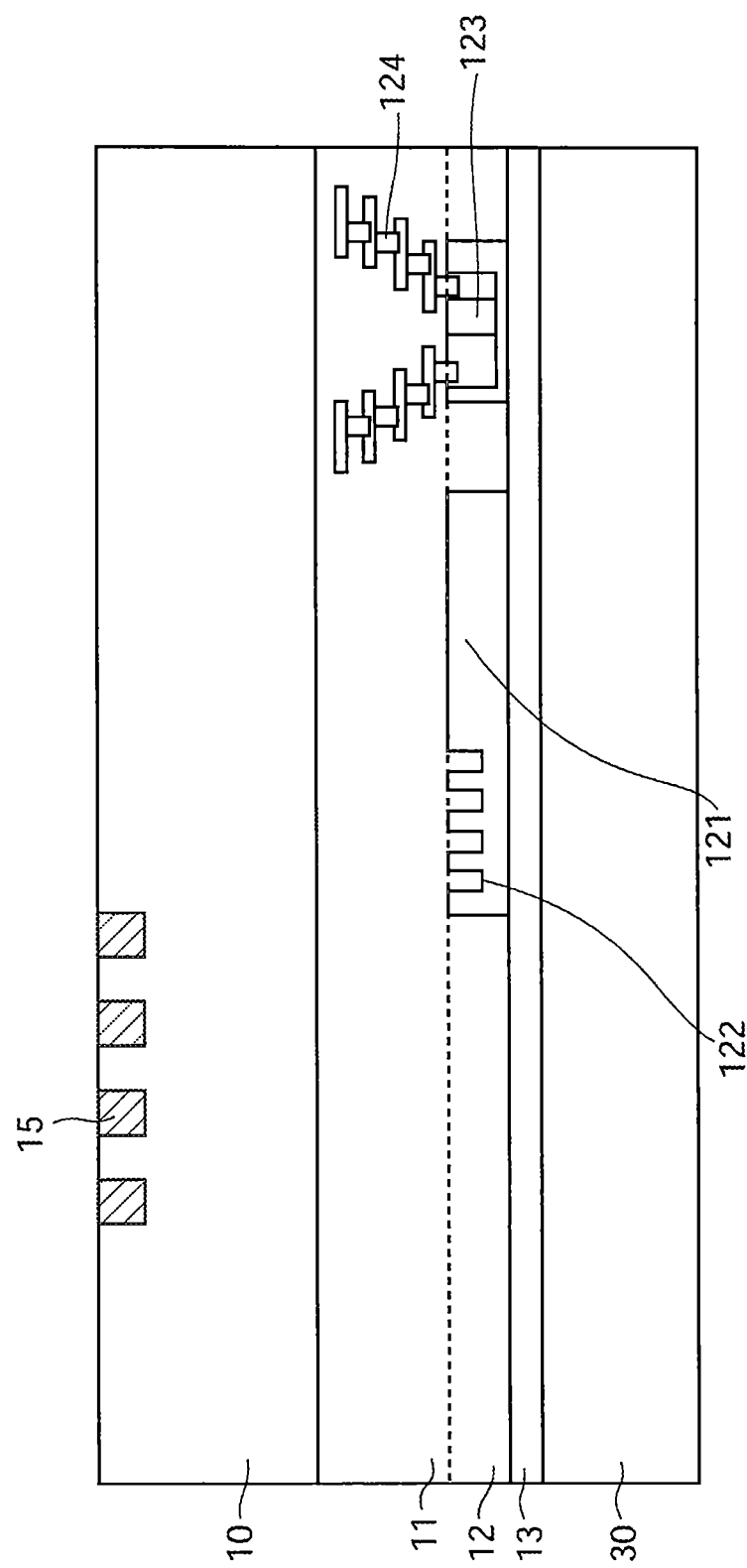
Figure 11E:
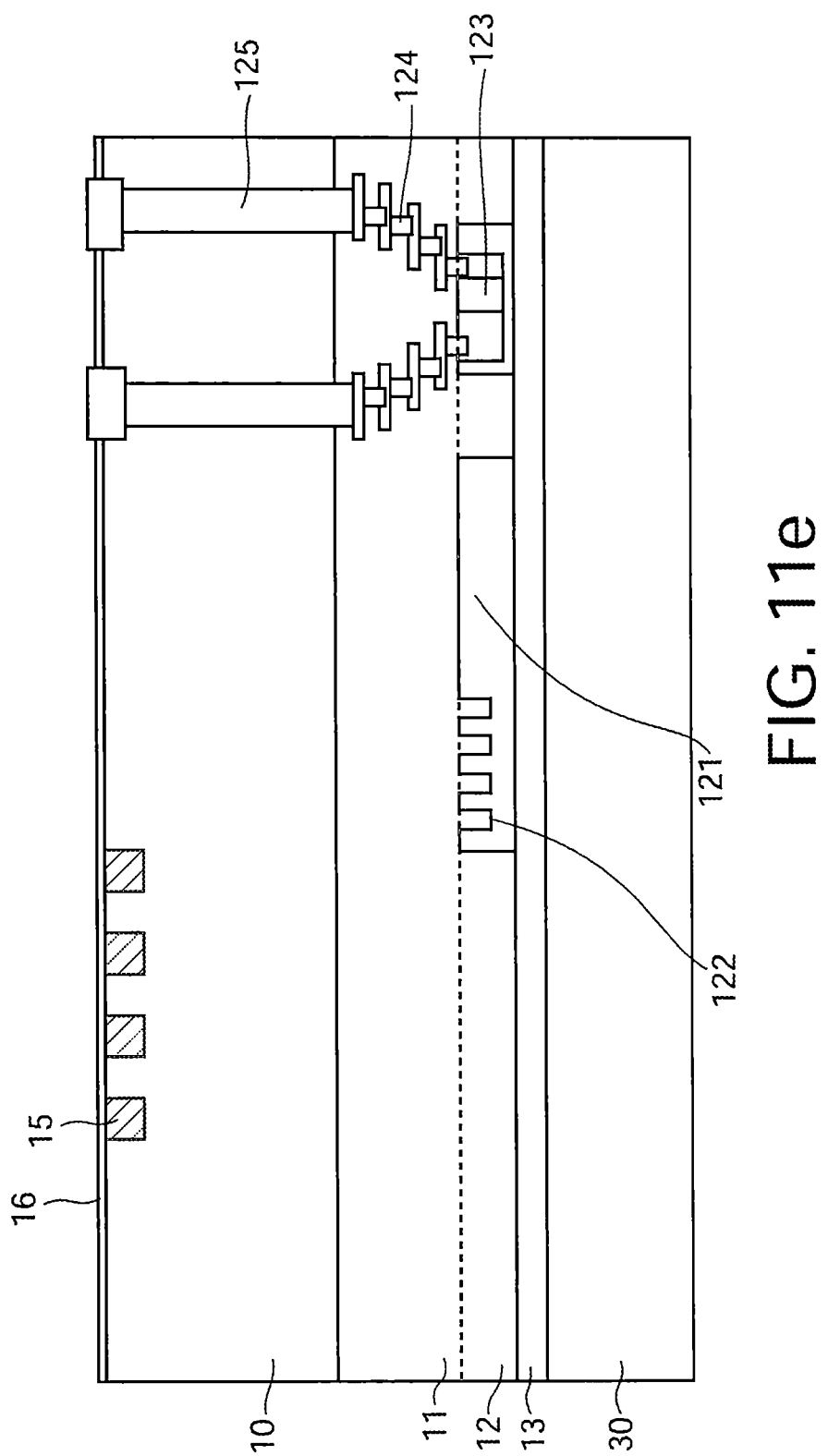

The next step (FIG. 11d) is the formation of a digital lens 15 on the substrate 10. The formation of the lens 15 is done by etching trenches delineating patterns of invariable thickness. The trenches are next filled with a low index material, for example $SiO_2$ flush with the surface of the chip. The next step (FIG. 11e) is the deposition of a metal layer 16 on the lens 15 in such a way as to form a reflective lens.

Figure 11F:
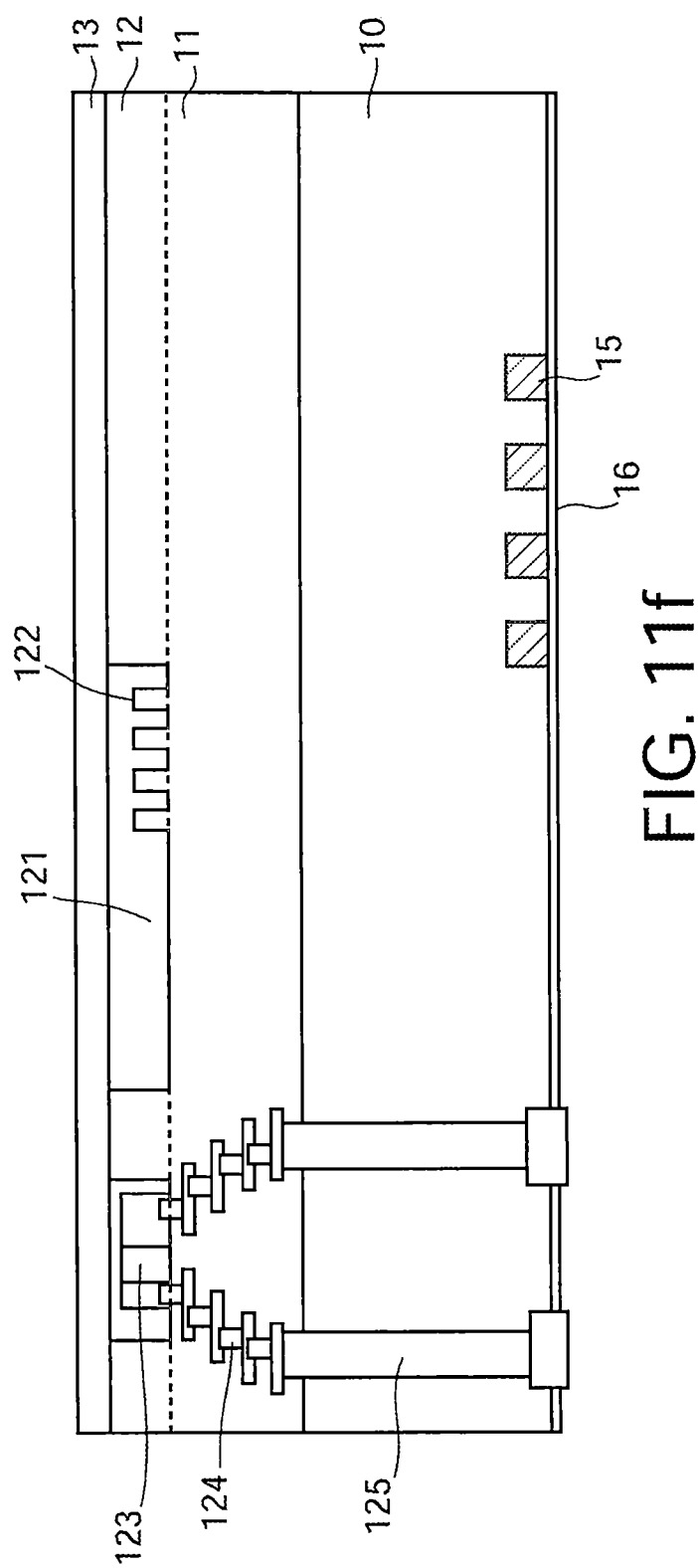
Figure 11G:
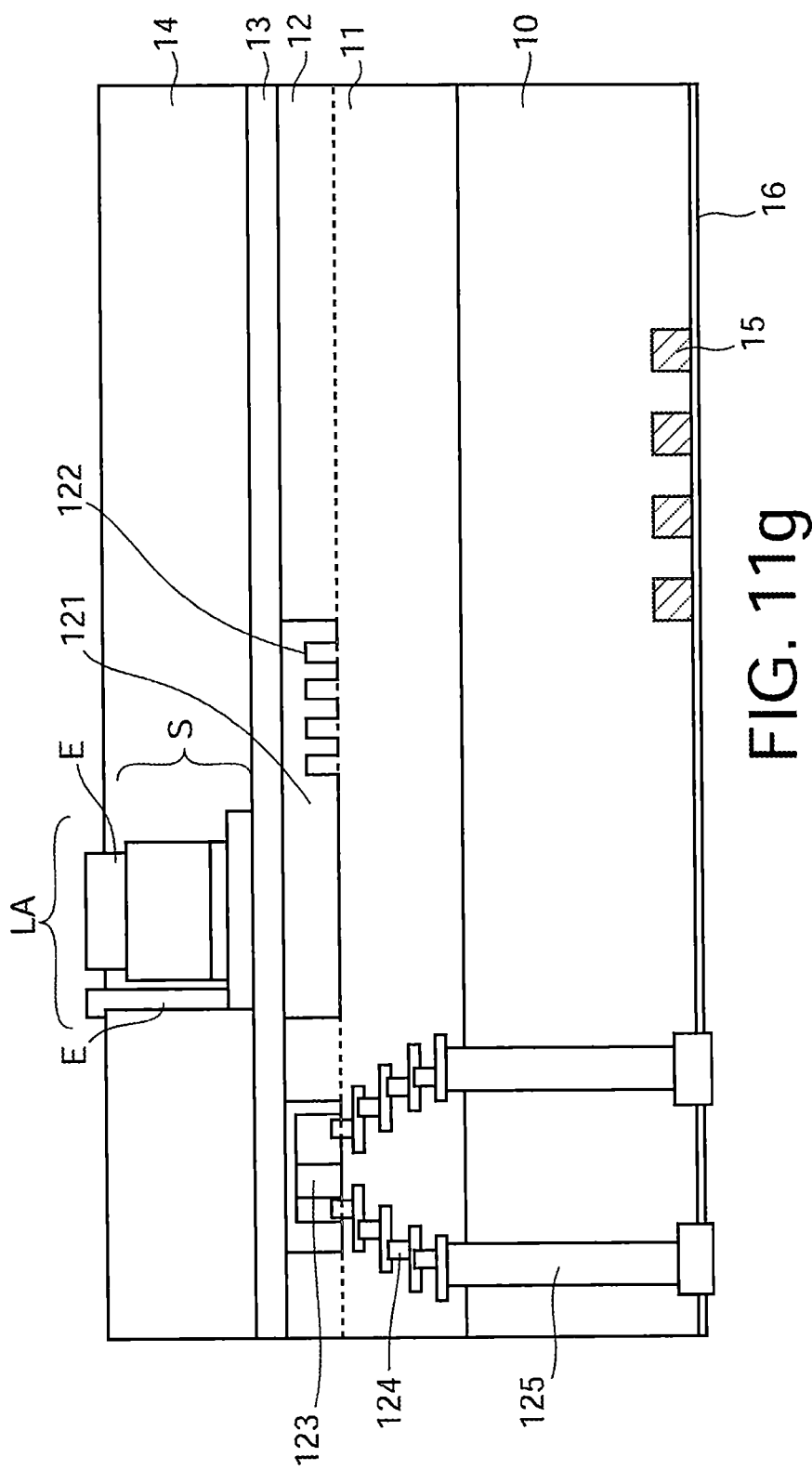

The next step is the formation of vias through the substrate 10, for example by laser etching, and filling these vias with a metal to form electrical interconnection vias 125 which, connected to those 124 present in the layer 11, make it possible to connect the active photonic components (such as the modulator 123) to an electronic chip. The next step is the turning over of the wafer and the removal of the silicon substrate 30 (FIG. 11f). The laser LA is next manufactured by producing a stack S of III-V layers on the layer 13, by structuring this stack to form the gain medium of the laser, by manufacturing the electrodes E, and by forming the second encapsulation layer 14 (FIG. 11g).

The invention is not limited to the photonic chip, but also extends to its method of manufacture, and notably to a method for manufacturing several chips collectively on a same wafer. This method includes the formation of the collimation structure at the level of the rear face of the chip and of the vertical coupler configured to receive light from the light guiding structure and to form a light beam directed to the collimation structure.

The invention also extends to a system including the photonic chip according to the invention and an external device provided with a collimation structure of which the mode size is adapted to that of the light beam in input/output of the photonic chip and which is intended to re-converge the beam on a single-mode fibre for example.

The invention also relates to such a photonic chip which can integrate one or more hybrid lasers, such as lasers having a gain medium made of III-V semiconductor materials on a silicon substrate. This photonic chip is intended to supply a comb of wavelengths emitted by the plurality of lasers to another photonic chip not including lasers (cf. FIG. 8 for example), or instead intended to emit a light beam in free propagation.

The invention claimed is:

1. A photonic chip including:
  a light guiding layer supported by a substrate,
  a front face on the light guiding layer side,
  a rear face on the substrate side,
  a lens integrated at the level of the rear face,
  a light guiding structure in the light guiding layer, and
  a vertical coupler in the light guiding layer,
  wherein the light guiding structure is optically coupled to the vertical coupler, wherein the vertical coupler is configured to receive/transfer light from/to the light guiding structure and form/receive a light beam in the direction of/from the lens, wherein the lens includes a plurality of trenches made in the rear face, the trenches delineating a two-dimensional array of posts and each post having, in a direction orthogonal to the front and rear faces, an invariable thickness,
  wherein the substrate has a thickness Th and a refractive index n10, the light beam forms an angle $\Theta 2$ with an axis perpendicular to the front and rear faces, the light has a wavelength $\lambda$, the light beam formed/received by the vertical coupler has a mode size Do=2.wo and the two-dimensional array of posts has a characteristic dimension greater than or equal to Th×2$\lambda$/($\pi$. wo×cos $\Theta 2$. n10).

2. The photonic chip according to claim 1, in which the two-dimensional array of posts includes elementary cells repeating periodically according to a period P, each elementary cell including a post and the dimensions of the posts being modulated from one elementary cell to the next, the period P being preferably less than $\lambda/2$.

3. The photonic chip according to claim 1, in which the lens has a centre and a median axis orthogonal to the front and rear faces passing through its centre, the median axis of the lens and an axis orthogonal to the front and rear faces passing through the centre of the vertical coupler being offset by a distance Th*tan Θ2.

4. The photonic chip according to claim 3, in which the lens has a circular symmetry around its median axis, the posts equidistant from the median axis being of identical size.

5. The photonic chip according to claim 3, in which the lens has a circular symmetry around the axis orthogonal to the front and rear faces passing through the centre of the vertical coupler, the posts equidistant from said orthogonal axis being of identical size.

6. The photonic chip according to claim 3, in which the lens has a circular symmetry around an axis of symmetry orthogonal to the front and rear faces, the axis of symmetry passing in the plane of the lens at a point situated between the centre of the lens and the projection of the centre of the vertical coupler, the posts equidistant from the axis of symmetry being of identical size.

7. The photonic chip according to claim 1, in which the posts are parallelepipedic or cylindrical.

8. The photonic chip according to claim 1, in which the lens is a Fresnel lens.

9. The photonic chip according to claim 1, in which the lens is reflective.

10. The photonic chip according to claim 1, in which the vertical coupler is a tilted facet waveguide or a surface grating coupler.

11. The photonic chip according to claim 10, in which the surface grating coupler is conformed to receive/transfer light from/to the light guiding structure and form/receive a light beam of mode size less than 12 μm in the direction of/from the lens.

12. A method of manufacturing a photonic chip which includes a light guiding layer supported by a substrate, a front face and a rear face on the substrate side, the method including forming a lens on the rear face and forming, in the light guiding layer, of a light guiding structure and a vertical coupler configured to receive light from the light guiding structure and to form a light beam directed to the lens, wherein forming the lens includes etching of a plurality of trenches in the rear face, the trenches delineating a two-dimensional array of posts and each post having, in a direction orthogonal to the front and rear faces, an invariable thickness, wherein the lens has a centre and a median axis orthogonal to the front and rear faces passing through its centre, the median axis of the lens and an axis orthogonal to the front and rear faces passing through the centre of the vertical coupler being offset by a distance Th*tan Θ2, and wherein Θ2 is an angle that the light beam forms with an axis perpendicular to the front and rear faces.

13. A method of manufacturing a photonic chip which includes a light guiding layer supported by a substrate, a front face and a rear face on the substrate side, the method including forming a lens on the rear face and forming, in the light guiding layer, of a light guiding structure and a vertical coupler configured to receive light from the light guiding structure and to form a light beam directed to the lens, wherein forming the lens includes etching of a plurality of trenches in the rear face, the trenches delineating a two-dimensional array of posts and each post having, in a direction orthogonal to the front and rear faces, an invariable thickness, the two-dimensional array of posts having a characteristic dimension greater than or equal to Th×2λ/(π.wo×cos Θ2. n10), with Th the thickness of the substrate, n10 the refractive index of the substrate, Θ2 an angle that the light beam forms with an axis perpendicular to the front and rear faces, λ the wavelength of the light beam and Do=2. wo a mode size of the light beam formed/received by the vertical coupler has a mode size.

14. A photonic chip comprising:
a light guiding layer supported by a substrate,
a front face on the light guiding layer side,
a rear face on the substrate side,
a lens integrated at the level of the rear face,
a light guiding structure in the light guiding layer, and
a vertical coupler in the light guiding layer,
wherein the light guiding structure is optically coupled to the vertical coupler,
wherein the vertical coupler is configured to receive/transfer light from/to the light guiding structure and to form/receive a light beam in the direction of/from the lens,
wherein the lens includes a plurality of trenches made in the rear face, the trenches delineating a two-dimensional array of posts and each post having, in a direction orthogonal to the front and rear faces, an invariable thickness,
wherein the lens has a centre and a median axis orthogonal to the front and rear faces passing through its centre, the median axis of the lens and an axis orthogonal to the front and rear faces passing through the centre of the vertical coupler being offset by a distance Th*tan Θ2, and
wherein Θ2 is an angle that the light beam forms with an axis perpendicular to the front and rear faces.

15. The photonic chip according to claim 14, in which the lens has a circular symmetry around its median axis, the posts equidistant from the median axis being of identical size.

16. The photonic chip according to claim 14, in which the lens has a circular symmetry around the axis orthogonal to the front and rear faces passing through the centre of the vertical coupler, the posts equidistant from said orthogonal axis being of identical size.

17. The photonic chip according to claim 14, in which the lens has a circular symmetry around an axis of symmetry orthogonal to the front and rear faces, the axis of symmetry passing in the plane of the lens at a point situated between the centre of the lens and the projection of the centre of the vertical coupler, the posts equidistant from the axis of symmetry being of identical size.

* * * * *